US008368911B2

(12) United States Patent
Hirosugi et al.

(10) Patent No.: US 8,368,911 B2
(45) Date of Patent: Feb. 5, 2013

(54) IMAGE FORMING APPARATUS AND METHOD OF CONTROLLING SAME, AND INFORMATION PROCESSING APPARATUS AND METHOD

(75) Inventors: Yoko Hirosugi, Kanagawa (JP); Takayuki Ochiai, Tokyo (JP); Takeshi Matsushita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 552 days.

(21) Appl. No.: 11/936,706

(22) Filed: Nov. 7, 2007

(65) Prior Publication Data

US 2008/0123114 A1 May 29, 2008

Related U.S. Application Data

(62) Division of application No. 10/766,870, filed on Jan. 30, 2004, now abandoned.

(30) Foreign Application Priority Data

Jan. 31, 2003 (JP) ................................. 2003-024541
Apr. 4, 2003 (JP) ................................. 2003-101434

(51) Int. Cl.
*G06K 15/00* (2006.01)

(52) U.S. Cl. ....................... 358/1.14; 358/1.15; 358/502

(58) Field of Classification Search .................. 358/1.1, 358/1.14, 1.15
See application file for complete search history.

(56) References Cited

U.S. PATENT DOCUMENTS 5,156,464 A * 10/1992 Sakai ............................. 400/56
6,425,650 B1 7/2002 Walker et al.
6,775,025 B1 8/2004 Robinson et al.
6,832,010 B2 12/2004 Miyazaki et al.
6,944,428 B2 9/2005 Hagiwara et al.
6,950,613 B2 9/2005 Fujimoto
2002/0018226 A1 2/2002 Yoshida
2002/0024575 A1 2/2002 Sato
2002/0067940 A1* 6/2002 Sasai et al. ...................... 400/61
2002/0089531 A1 7/2002 Hirasawa
2002/0135624 A1 9/2002 Naka et al.
2002/0176719 A1 11/2002 Yogome et al.
2002/0180822 A1 12/2002 Aritomi
2003/0016259 A1 1/2003 Otokita
2003/0053104 A1 3/2003 Morisaki et al.
2003/0112457 A1* 6/2003 Akiyama et al. ............ 358/1.14
2003/0202199 A1 10/2003 Carter et al.
2004/0061887 A1 4/2004 Murashima
2004/0184043 A1* 9/2004 Hirosugi et al. ............... 358/1.1
2006/0044334 A1* 3/2006 Fujita et al. ...................... 347/12
2008/0123114 A1* 5/2008 Hirosugi et al. ............... 358/1.1

FOREIGN PATENT DOCUMENTS

JP 5238099 9/1993
JP 7001791 1/1995
JP 7234767 9/1995
JP 7237334 9/1995

(Continued)

*Primary Examiner* — Benny Q Tieu
*Assistant Examiner* — Marcellus Augustin
(74) *Attorney, Agent, or Firm* — Fitzpatrick, Cella, Harper & Scinto

(57) ABSTRACT

Provided are an image forming apparatus and a method of controlling the same, an information processing apparatus and an information processing method, and a program for implementing these methods, in which the fact that a setting is to be changed can be reported to a host apparatus through a simple arrangement. The image forming apparatus for attaining this object includes storage unit for storing the latest set value of the apparatus, transmitting unit for transmitting the latest set value, which has been stored in the storage unit, to the host apparatus in response to a request from the host apparatus, and updating unit for receiving a print setting from the host apparatus and updating the latest set value stored in the storage unit.

5 Claims, 17 Drawing Sheets

FOREIGN PATENT DOCUMENTS

| | | |
|---|---|---|
| JP | 8044508 | 2/1996 |
| JP | 8185284 | 7/1996 |
| JP | 9179698 | 7/1997 |
| JP | 106609 | 1/1998 |
| JP | 11198486 | 7/1999 |
| JP | 11353130 | 12/1999 |
| JP | 200066849 | 3/2000 |
| JP | 2001142667 | 5/2001 |
| JP | 2002135493 | 5/2002 |
| JP | 2002292967 | 10/2002 |

* cited by examiner

FIG. 9

| PAPER INFORMATION IN DATA | LEVER POSITION INFORMATION |
|---|---|
| PLAIN PAPER ; SPECIAL PHOTO PAPER | NARROW |
| ENVELOPE | WIDE |

FIG. 10

| LEVER POSITION INFORMATION BEFORE PRINTING | LEVER POSITION INFORMATION AFTER PRINTING |
|---|---|
| NARROW | NARROW |
| WIDE | INDEFINITE |
| INDEFINITE | INDEFINITE |

IMAGE FORMING APPARATUS AND METHOD OF CONTROLLING SAME, AND INFORMATION PROCESSING APPARATUS AND METHOD

This application is a divisional application of co-pending application Ser. No. 10/766,870, filed Jan. 30, 2004, which is incorporated herein by reference.

FIELD OF THE INVENTION

This invention relates to an image forming apparatus, a method of controlling the same, an information processing apparatus, an information processing method and programs for implementing these methods, in which the setting of the image forming apparatus, such as a printer, can be performed through a simple arrangement and it is possible to reduce the occurrence of problems caused by printing media mismatch at the time of printing.

BACKGROUND OF THE INVENTION

Many ink-jet printers are being manufactured and sold to individual consumers as printing devices capable of forming high-quality images inexpensively. Many ink-jet printers being manufactured and sold on the assumption that individuals will be the purchasing group have a simple structure, particularly with regard to functions that cannot be implemented by software, because of such factors as balance between the functions believed to be necessary for individual use and the cost of manufacture. For example, in many cases such printers are not equipped with a mechanism that sets multiple types of printing paper as paper capable of being printed on or with a function for sensing the type and size of paper currently installed.

Meanwhile, the spread of digital cameras and the improvements that have been made in the image quality of ink-jet printers have been accompanied by utilization not only of plain paper but also of various types of media such as glossy paper and photo paper. At the time of printing, it is difficult to obtain the intended image quality unless the user selects the target medium by a setting made using a printer driver and supplies the printer with the medium selected using the printer driver.

Further, ink-jet printers usually have a mechanism that uses a paper-clearance adjusting lever to adjust the distance between a paper restraining portion, which is referred to as a platen, and the printhead in accordance with the thickness of the paper. Various methods of suitably adjusting the arrangement of the device in accordance with the fed paper have been proposed thus far. Specifically, a method of performing the adjustment automatically in response to a command from a panel has been disclosed in the specification of Japanese Patent Application Laid-Open No. 5-238099, and a method of performing the adjustment fully automatically has been disclosed in the specifications of Japanese Patent Application Laid-Open Nos. 7-237334 and 10-006609. However, these implementations require many parts and are high in cost. Consequently, many printers are equipped with a paper-clearance adjusting mechanism that is operated manually by the operator.

In inexpensive printers, therefore, many paper-clearance adjusting mechanisms make it possible to adjust paper clearance solely by a manual operation performed by the operator, and in many the set state also is checked manually by the operator.

There are many instances where a printer is connected to a network directly or indirectly and is shared by personal computers or the like. In such cases the printer is not equipped with a paper-size detecting mechanism of the above-mentioned kind or use is made of a printer in which the paper clearance adjustment must be performed manually. In a case where the operator in such a system causes a printer that is not located near a personal computer to print data, the type and size of paper that is currently loaded in the printer and the setting of the paper clearance cannot be checked unless one goes to the printer to see.

Furthermore, in an environment in which one printer is used by a plurality of users, there are cases where a certain user does not him/herself change the type or size of paper but another user does. As a consequence, though a certain user intends to perform printing with the settings that were utilized previously, often wasteful printing is the result because another person has set an OHP sheet in the printer or has installed paper of a size different from that desired to be used originally.

Problems of this kind can be eliminated by providing the printer with mechanisms such as sensors that sense print settings such as paper size and type and the paper-clearance setting. However, such an expedient leads to other problems, e.g., increases the number of parts, complicates the structure of the apparatus, raises the price and elevates the failure rate.

SUMMARY OF THE INVENTION

Accordingly, an object of the present invention is to provide an image forming apparatus and a method of controlling the same, an information processing apparatus and an information processing method, and a program for implementing these methods, in which the fact that a setting is to be changed can be reported to a host apparatus through a simple arrangement.

In particular, an object of the present invention is to provide a printing system in which even if use is made of an image forming apparatus that is not equipped with a sensor for identifying media type, the user can be notified of the possibility of a mismatch between a type of printing medium that has been specified and the type of printing medium supplied, and in which the labor involved in checking settings can be alleviated.

According to the present invention, a printing system is provided with means for acquiring print settings that were implemented by a printer immediately prior to processing that is about to be executed, performing a comparison for determining whether these settings are the same those of the processing about to be executed, and issuing an alert if the settings are different.

To achieve the above object, according to the present invention, an image forming apparatus is provided for receiving data from a host device and forming an image, which comprises:

a storage unit for storing a set value;

a transmitting unit for transmitting the set value, which has been stored in the storage unit, in response to a request from the host device; and an updating unit for updating the set value, which has been stored in the storage unit, based upon print data received from the host device.

Alternatively, according to the present invention, an image forming apparatus is provided for receiving data from a host device and forming an image, which comprises:

a storage unit for storing a set value; and a notifying unit for deciding a set value of the image forming apparatus in response to an image formation request from the host device, comparing the set value decided and the set value that has been stored in the storage unit, processing the image formation request if the two set values agree and, if the two set values do not agree, notifying the host device of this fact.

Preferably, the set value that has been stored in the storage unit includes size or type or both size and type of a sheet-like medium on which an image is formed.

Preferably, the image forming apparatus further comprises an image forming unit for forming an image by an ink-jet method;

wherein the set value that has been stored in the storage unit includes a setting of distance between an ink-jet printhead and a sheet.

Preferably, the image forming apparatus further comprises a panel for displaying messages and specifying inputs;

a determination unit for determining whether data received from the host device includes a confirmation command; and a confirmation unit for displaying a message on the panel and prompting an input in response to this message if the determination unit has determined that the data includes a confirmation command;

wherein an image is formed based upon the data if an input in response to the message is made by the confirmation unit.

Alternatively, according to the present invention, an information processing apparatus is provided for forming an image by an image forming unit, which comprises:

an acquisition unit for acquiring a set value from the image forming unit; and a comparison unit for comparing a specified set value in image formation and the set value that has been acquired by the acquisition unit, transmitting an image formation request to the image forming unit if the two set values agree and, if the two set values do not agree, displaying this fact by a display.

Alternatively, according to the present invention, an image forming system is provided, in which an image forming apparatus and an information processing apparatus are connected, wherein the image forming apparatus comprises:

a storage unit for storing a set value of the image forming apparatus;

a transmitting unit for transmitting the set value, which has been stored in the storage unit, in response to a request from the information processing apparatus; and an updating unit for updating the set value, which has been stored in the storage unit, based upon print data received from the information processing apparatus; and the information processing apparatus comprises:

an acquisition unit for acquiring a set value from the image forming apparatus; and a comparison unit for comparing a specified set value in image formation and the set value that has been acquired by the acquisition unit, transmitting an image formation request to the image forming apparatus if the two set values agree and, if the two set values do not agree, displaying this fact by a display.

alternatively, according to the present invention, an image forming system is provided, which comprises the image forming apparatus set forth above, and an information processing apparatus, which is connected to the image forming apparatus, for receiving notification from the image forming apparatus and displaying it on a display.

alternatively, according to the present invention, an image forming system is provided, in which a latest set value that has been stored in a printer is acquired and, if the set value differs from a set value that has been specified, this fact is reported.

By virtue of the arrangement set forth above, the latest settings of an input/output device conforming to a requested input/output operation are stored in the input/output device itself. As a result, even if the input/output device is not equipped with means for detecting actual settings, whether or not it is necessary to change the settings can be judged for every input/output device and the user can be notified of the necessity to make the change in settings.

As a result, even if a plurality of input/output devices are utilized, the above-mentioned actions and effects can be obtained for each device.

Furthermore, since it is not required that an input/output device have means for detecting actual settings, it is possible to lower cost and enhance resistance to failure.

Furthermore, by furnishing a user with appropriate information, it is possible to prevent an undesirable operation from being carried out and productivity can be improved.

Further, according to the present invention, it is possible to prevent printing from being performed on a printing medium unintended by the user, even in a printer devoid of a sensor for identifying the printing medium, by executing printing-medium confirmation processing. Further, printing can be started by a confirmation switch on the printer and the user need not take the trouble to return to the host computer after confirmation of the printing medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 illustrates a correspondence table showing the correspondence between paper information and a paper-clearance adjusting lever;

FIG. 10 is a table illustrating the transition of a paper-clearance adjusting lever based upon printing from a non-personal computer;

DETAILED DESCRIPTION OF THE PREFERRED EMBODIMENTS

Preferred embodiments of the present invention will now be described in detail with reference to the drawings.

First Embodiment

Figure 2:
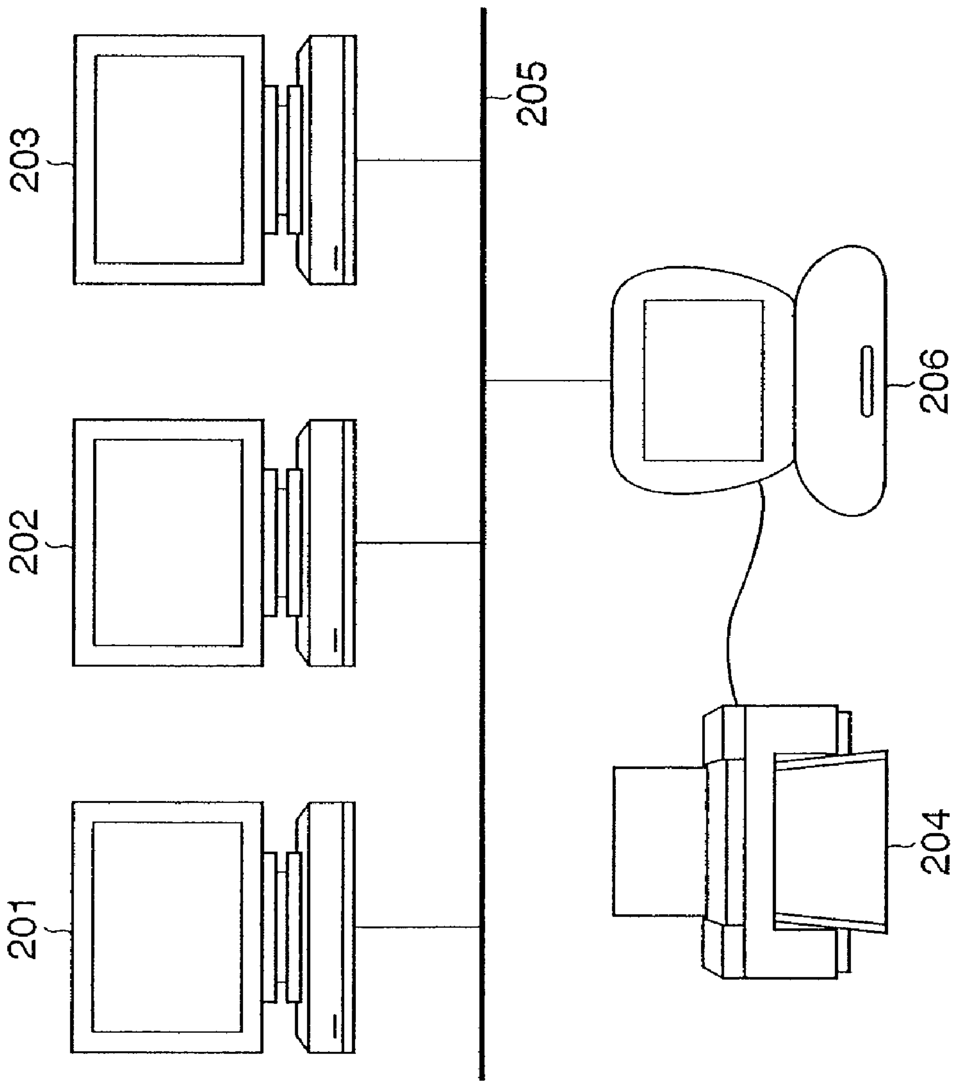
FIG. 2 is a diagram illustrating the system configuration of the first embodiment.

FIG. 2 is a diagram for describing the configuration of a system constructed by connecting information processors and a printing apparatus in a first embodiment of the present invention. FIG. 2 shows an example of a system configuration in which host computers 201, 202, 203, and 206 are capable of bi-directional communication via a network 205 such as a LAN. A printer 204 is connected to the host computer 206 via a parallel (or serial) interface (a local interface) that is not a LAN. Further, the printer 204 is connected to a network interface 205 via the host computer 206 and is capable of being utilized from the host computers 201, 202 and 203 as well.

In FIG. 2, each personal computer has a monitor such as a CRT or LCD, and a control unit for controlling access to a floppy-disk drive or CD-ROM drive (not shown) connected via a bus on a control board and to an input/output device such as a keyboard and pointing device, not shown. The control unit (controller) includes an external storage device such as a hard disk on which an operating system and a printing control program such as a printer driver for controlling the printer have been installed. The arrangement is such that print information is transferred to the printer 204 via the operating system and printer driver in accordance with a print request from an application. The above holds true also in a case where the printer 204 is utilized from another personal computer via the host computer 206 functioning as a printer server.

Figure 3:
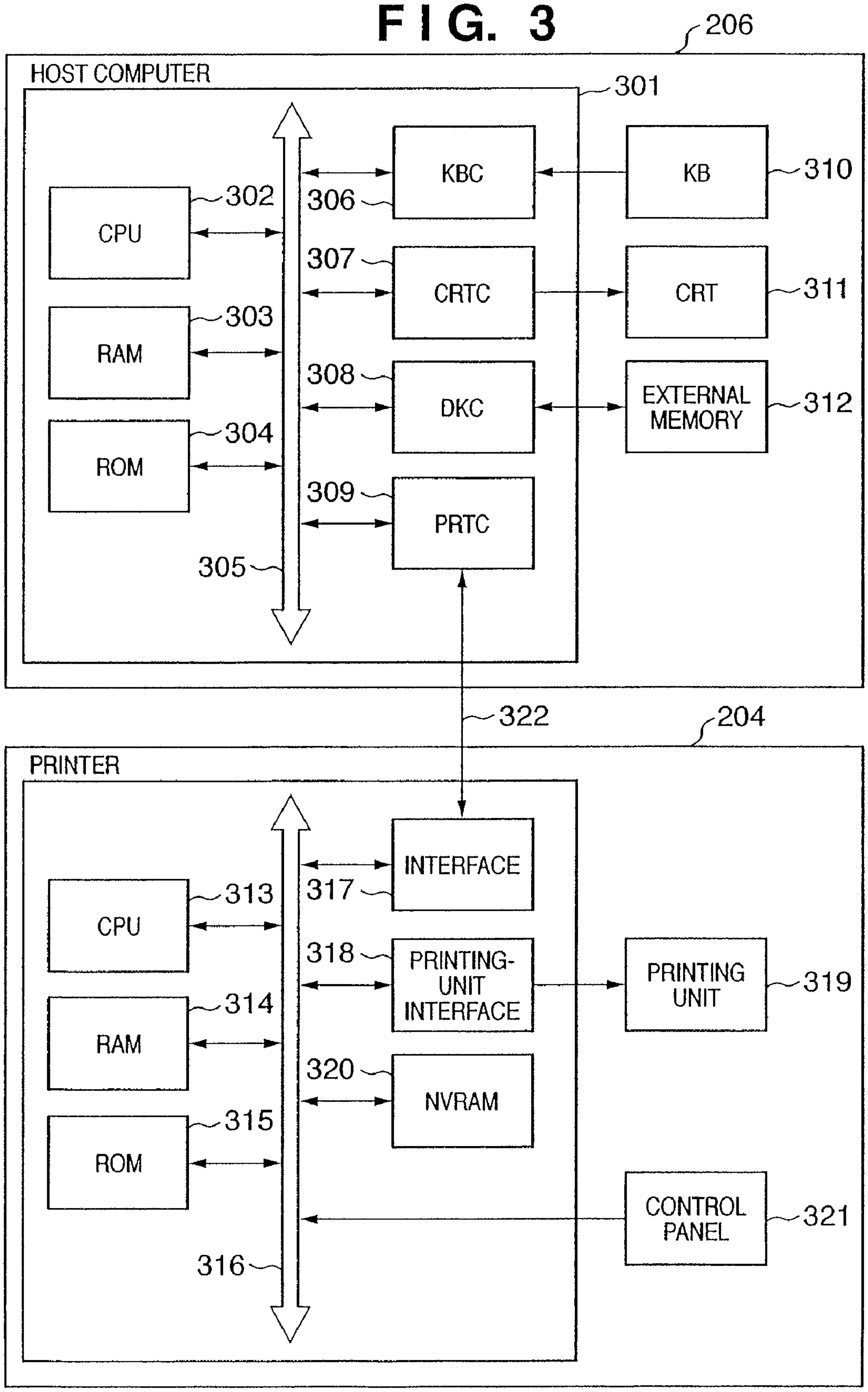
FIG. 3 is a block diagram useful in describing the control components of a printing apparatus according to the first embodiment.

FIG. 3 is a block diagram useful in describing the control structures of a host computer and printing apparatus according to the first embodiment. The control structures of this host computer and printing apparatus correspond to the control structures of the host computer 206 and printer 204 shown in FIG. 2.

In FIG. 3, the host computer 206 has a controller 301, a keyboard 310 serving as an input device, a CRT 311 serving as display unit, and an external memory 312 such as a hard disk or optical disk. The controller 301 has a CPU 302 for executing processing based upon a program and the like stored in a ROM 304. The CPU 302 performs overall control of the devices connected to a system bus 305. The control program executed by the CPU 302, font data used in word processing and the like, and various data used in word processing and the like (e.g., commands for performing various settings such as paper size and type supported by the printer) are stored in the ROM 304 or on a hard disk (not shown) serving as the external memory 312.

The controller 301 includes a RAM 303, which is capable of being expanded by optional RAM or the like, for functioning as the main memory and work area of the CPU 302. A keyboard controller (KBC) 306 controls key inputs from a keyboard 310 and a pointing device, which is not shown. A CRT controller (CRTC) 307 controls the display on a CRT display 311. A disk controller (DKC) 308 controls access to an external memory 312, such as a hard disk or floppy (registered trademark) disk, which stores a booting program, various applications, font data, user files and edited files. A printer controller (PRTC) 309, which is connected to a printer 323 via a prescribed bidirectional interface 322, executes processing for controlling communication with the printer 323. It should be noted that the CPU 302 executes processing to expand (rasterize) outline fonts in a display-information RAM area provided in, say, the RAM 303, and is capable of implementing a WYSIWYG (What You See I What You Get) function on the CRT 311. Further, on the basis of commands designated by a mouse cursor (not shown) or the like on the CRT 311, the CPU 302 opens various windows that have been registered and executes a variety of data processing. Further, the CPU 302 executes the processing of a flowchart (described later) by executing a program. It should be noted that although FIG. 3 is for describing the structure of the host computer 206, the structure of the other personal computers 201 to 203 is similar.

The printer 204 has a controller that includes a CPU 313. On the basis of a control program, etc., stored in a ROM 315, the CPU 313 controls overall access to various devices connected a system bus 316 and outputs an image signal as output information to a printing unit (printer engine) 319 connected via a printing-unit interface 318. An analysis program for analyzing a printer-setting acquisition command sent from the host computer via an interface 317 has been stored in the ROM 315. The CPU 313 is capable of executing processing for communicating with the host computer via the interface 317. It is so arranged that the CPU 313 can report information regarding the status of the printer stored in a non-volatile RAM (NVRAM) 320 within the printer 204 (in this embodiment, the information includes print settings such as the paper size and type used in the print job processed immediately previously) to the host computer. A RAM 314 functions as a main memory and work area, etc., of the CPU 313. A control panel 321 has an array of switches and LED indicators for exercising control.

In this embodiment, a printing system in which the host computer and printer 204 are capable of communicating via bidirectional interface 322 is illustrated as an example. However, the present invention is applicable also to a printing system in which the host computer and printer 204 are capable of communicating via a network such as a LAN. However, the interface section is constituted by a network controller. It should be noted that the non-volatile RAM (NVRAM) 320 stores print settings information reported from the host computer. The RAM 314 is constructed to have a buffer area for holding print information received from the host computer and a working area of the CPU 313. The printing unit (printer engine) 319 has a structure that conforms to the printing method. According to this embodiment, the printing unit has an ink-jet-type structure and comprises a printer cartridge and a carriage, etc. The interface 317 receives print data from the host computer in accordance with a predetermined protocol and executes processing to notify the host computer of status information, etc., generated by the printer 204. Further, the CPU 313 is adapted so as to be capable of controlling the state of power supplied from a power supply (not shown). If data is not received from the host computer for a fixed period of time, the CPU 313 exercises sleep control to conserve power supplied to each component. It should be noted that print data includes commands and parameters for causing the printer to perform a certain operation and does not refer solely to data that represents an image to be printed.

Figure 1A:
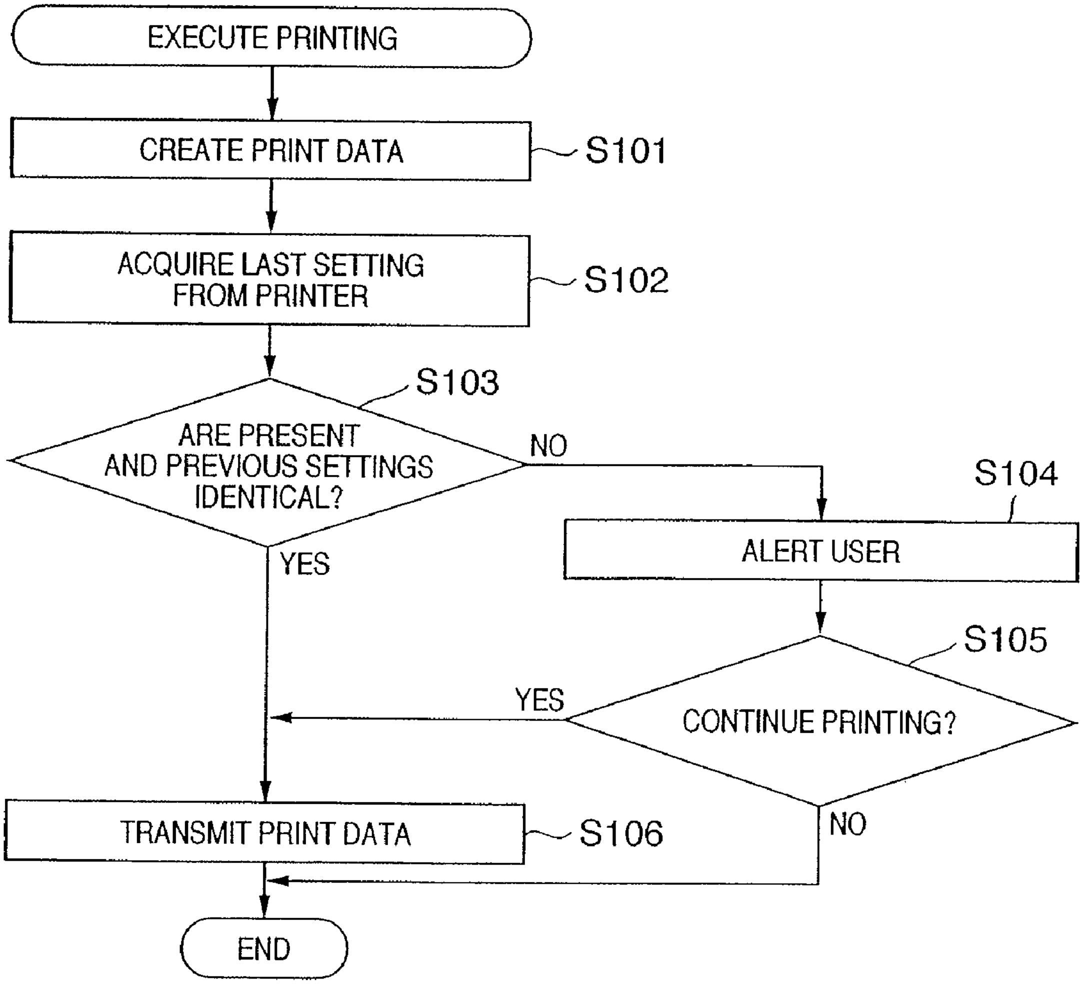
FIGS. 1A and 1B are diagrams illustrating an example of the flow of processing according to a first embodiment of the present invention.

FIG. 1A is a flowchart illustrating an example of the flow of processing by the printer driver that has been installed in the personal computer. This processing is executed after print processing has been commanded in the personal computers 201 to 203, 206 in this embodiment.

In FIG. 1A, the printer driver in which execution of printing has been commanded creates print data for transmission to the printer 204 in accordance with printing conditions that have been set by the user (step 101). The print data includes, in addition to image data to be printed, settings information relating to printing conditions such as paper type, size and print quality.

Figure 16:
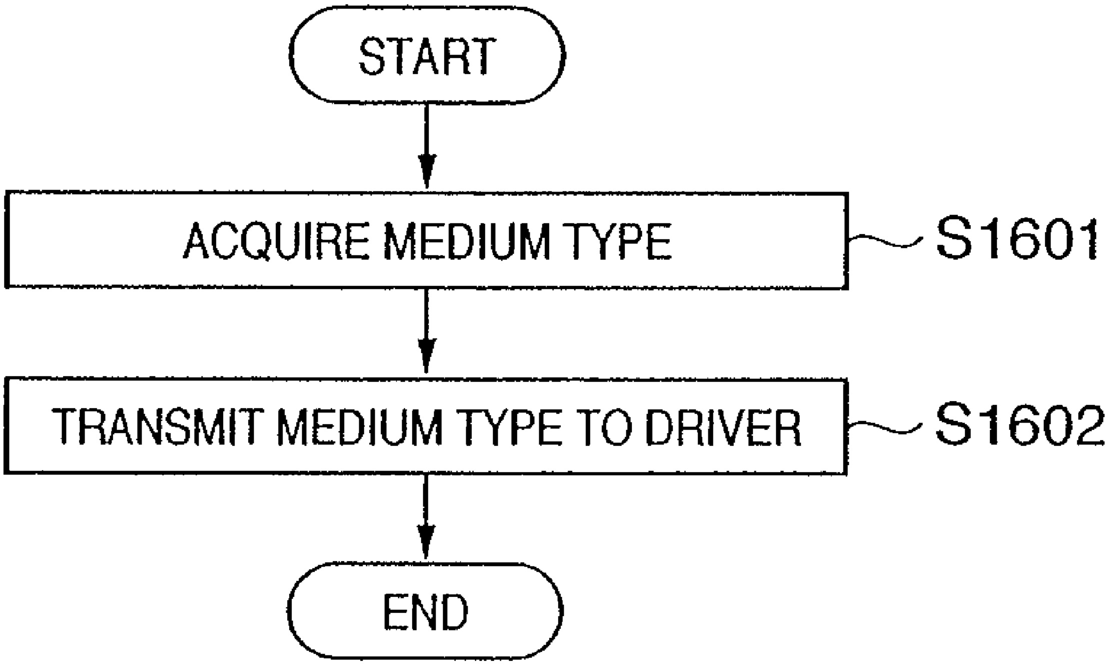
FIG. 16 is a flowchart illustrating the flow of processing in a printer in response to an inquiry from a printer driver.

Next, a settings request command, which requests settings information such as paper type and size that were set in print processing executed the last time (i.e., immediately previously), is transmitted to the printer 204, and settings information such as paper type and size specified in the immediately previous print processing is acquired from the printer 204 (step 102). Upon receiving the settings request command, the printer 204 sends the requesting personal computer the settings information that has been stored in the NVRAM 320. The procedure of processing executed by the printer is as illustrated in FIG. 16. The settings information from the last time is settings information that has been stored in the NVRAM 320 of the printer 204. This information is capable of being set in regard to a variety of units of processing. In this embodiment, it is assumed that settings information is given for every print job that corresponds to the totality of print data created by an application running on the personal computer. Accordingly, the immediately previous settings information corresponds to settings information regarding the print job executed last in the printer 204.

The printer driver that has acquired the settings information from the printer 204 performs a comparison for determining whether the paper type and size included in the acquired settings information are the same as those specified in the print data about to be transmitted (step 103). If the two agree, the printer driver transmits the created print data to the printer along with the settings information (step 106). It should be noted that the paper type and size specified in the print data about to be transmitted are specified by the user via the user interface of the application software or the user interface of the printer driver and that the specified values are held in the RAM, etc., before the procedure of FIG. 1A is executed. In other words, the paper type and size (the type of medium) being held in the RAM are the present paper type and size specified in the print data about to be transmitted.

If either the paper type or size in the print processing executed last by the printer differs from the setting regarding the print data about to be transmitted, then a window (see FIG. 4) for notifying the user (the operator) of the fact that either the paper type or size setting or both in the print job about to be processed differs from the printer setting is displayed on the CRT 311 of the host computer (step 104). Upon viewing this screen, the operator goes to the printer if necessary and exchanges the paper or changes the printer settings in conformity with the print settings of the print job about to be printed.

The apparatus then waits for an input from the operator. If there is an input, then the apparatus determines whether continuation of printing has been ordered (i.e., whether the "YES" button in FIG. 4 has been clicked) (step 105). If continuation of printing has been ordered, the print data and the settings information are transmitted to the printer (step 106). If continuation of printing has not been ordered (i.e., if the "NO" button in FIG. 4 has been clicked), then the print data is discarded and print execution processing is exited.

The NVRAM of the printer 204 has an area for storing settings information such as the type and size of paper that have been set in the most recent (i.e., the last) print processing. Upon receiving the command, which requests the immediately previous print settings information, from the printer driver at step 102, the printer sends back to the printer driver the settings information such as the paper type and size that were set at the time of the immediately previous print processing and stored in NVRAM 320.

Figure 1B:
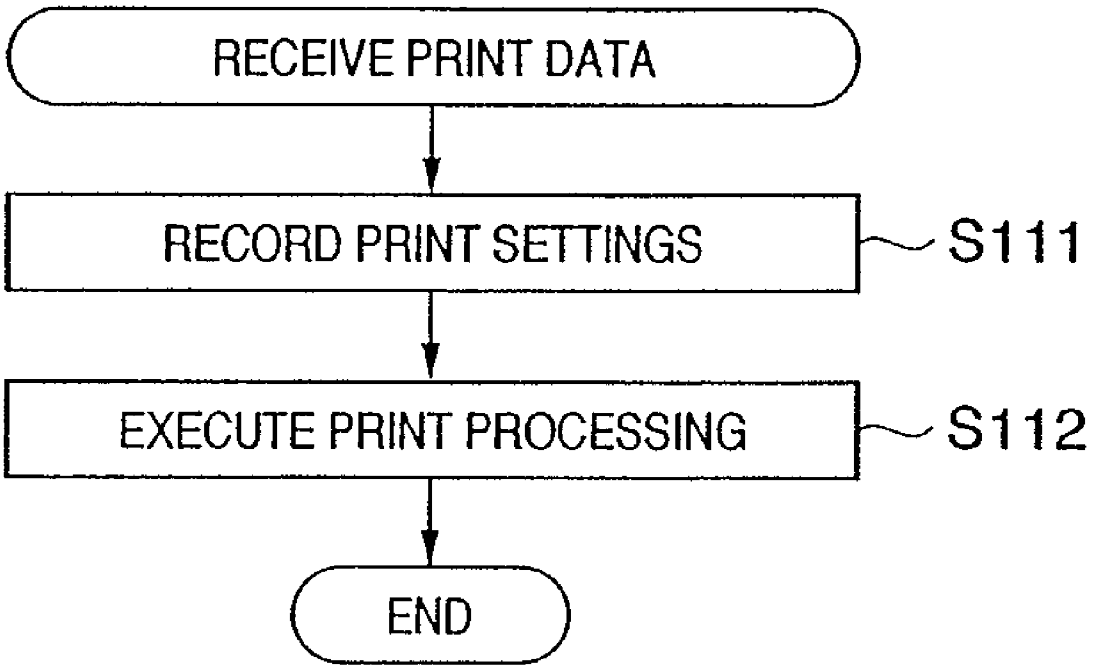

FIG. 1B illustrates the procedure of processing executed by the printer 104 that has received print data. The printer that has received the print data saves the settings information such as the paper type and size from this print data in the NVRAM 320 (step 111) and prints the print data that has been received (step 112).

Thus, print settings that have been specified in regard to the latest processed print job are saved in the NVRAM 320 of the printer. The print settings that have been saved in the printer are regarded as the print settings to which the printer has actually been set, and a message prompting the operator to change the settings of the printer is displayed. As a result, the possibility that settings are incorrect can be reported to the operator of a printer without the printer being provided anew with a mechanism for sensing print settings that the printer itself cannot sense.

In addition, even in a case where print settings that differ from those of the job about to be printed were being used until just previously, the user can be alerted before the execution of printing, thereby preventing wasteful printing.

Furthermore, the above effects can be obtained through an inexpensive, simple arrangement even though the printer is not equipped with mechanisms such as sensors.

More specifically, even if a printer does not have a mechanism for sensing the type and size of paper that has been loaded in the printer, means are provided for acquiring the paper type and size set by the print processing executed by the printer the last time. As a result, in an environment in which a single printer is used by multiple users, it is possible to reduce the waste that occurs when printing is performed on paper whose type and size differ from those intended by the user. Conversely, it is possible for a function that allows the operator of a computer to grasp the print settings of a printer to be provided by the printer, which is devoid of sensors for sensing the print settings. This function can be provided at low cost by a printing system in which causes of failure have been reduced.

Further, even in a system in which a plurality of printers are connected, the settings information is saved in the printers beforehand and therefore each printer can achieve the above-described effects by having the system execute the processing of FIGS. 1A and 1B in regard to each printer.

First Modification of First Embodiment

In the above embodiment, matching is discriminated with regard to paper type and size at step 103 in FIG. 1. However, this is merely one example. The present invention is applicable not only to paper size and type but also in regard to manually set items that require the operator to change printer settings by a manual operation in accordance with print settings specified in a print job.

Second Modification of First Embodiment

In the above embodiment, it is assumed that settings information is set on a per-print-job basis. However, this does not impose a limitation because the information can be set on a per-page basis or on the basis of some other unit.

Third Modification of First Embodiment

In the procedure illustrated in FIGS. 1A and 1B, settings information is read in from the printer before print data is transmitted to the printer. This procedure may be abbreviated and the print data may be transmitted from the printer driver to the printer. In such case the printer compares the settings information that is included in the print data and settings information stored in the NVRAM, suspends processing and alerts the computer if the compared information differs, and executes printing as is if the compared information matches. If the computer is alerted, then the computer displays this in the manner of FIG. 4 and prompts the operator to change or check the settings. If continuation of printing has been specified, then the computer sends the printer a command to continue with printing. If aborting of the print job has been specified, then the computer issues a command to halt print processing and to discard the print data. The printer responds to the commands by either continuing or aborting print processing.

By thus allowing the printer to compare the settings information, transmission of settings information from the printer to the computer prior to transmission of the print data is not carried out and therefore the time from commanding of printing to start of printing can be curtailed in an instance where no alert is issued.

Fourth Modification of First Embodiment

In the above embodiment, the printer is connected to a network via a computer acting as a printer server. However, the present invention is also applicable to a network printer in which the printer itself has a network interface and is connected to a network without the intermediary of a printer server.

Second Embodiment

Figure 5:
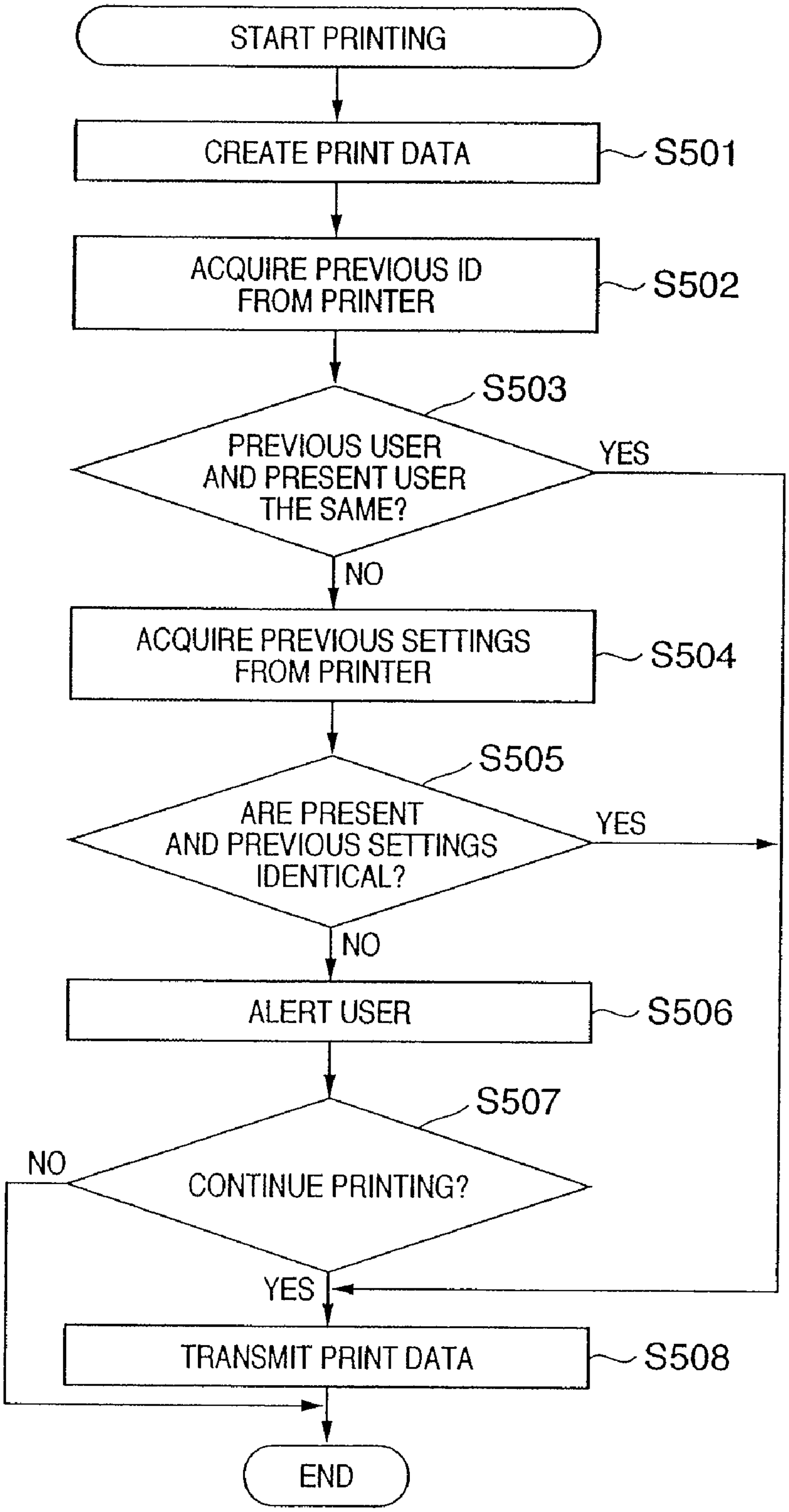
FIG. 5 is a diagram illustrating an example of the flow of processing according to a second embodiment of the present invention.

In a second embodiment of the present invention, a printer driver ID for allowing a printer to distinguish individual printer drivers is issued to a printer driver when the printer driver is installed. The printer driver ID is used to notify the printer of the printer driver that is about to allow printing to be performed by the printer and is one settings command that is transmitted to the printer together with the print data. One example of a method of issuing the printer driver ID is to send the printer an instruction for granting the printer driver ID and allow the ID to be applied by the printer. The printer assigns a serial number in accordance with the request to issue the printer driver ID, by way of example. Alternatively, a unique value can also be assigned by combining the date or time at which the printer driver was installed and the identifying name of the computer in which the printer driver was installed. This printer driver ID is managed by the operating system or printer driver and is transmitted to the printer 204 together with the print data and is also stored in the NVRAM of this printer. FIG. 5 is a flowchart illustrating an example of the flow of processing by the printer driver according to the second embodiment.

In FIG. 5, the printer driver in which execution of printing has been commanded creates print data for transmission to the printer in accordance with printing conditions that have been set by the user (step 501). The print data includes, in addition to image data to be printed, settings information, which relates to printing conditions such as paper type, size and print quality, and a printer driver ID.

Next, a command for acquiring from the printer 204 the ID of the printer driver that ordered the immediately preceding print processing is transmitted to the printer 204. The printer 204 reads out the ID, which has been recorded in a predetermined area of the NVRAM, and sends it back to the computer. As a result, the printer driver acquires the ID of the printer driver that ordered the immediately preceding print processing (step 502). The printer driver determines whether the ID of the printer driver that ordered the printer to print the last time, which ID has been acquired from the printer 204, is identical with its own ID (step 503). If the two are identical, then the printer driver determines that the type and size of the paper that has been loaded in the printer are as intended by the user and the transmits the print data (step 508).

If the ID of the printer driver that ordered printing the last time is different from its own ID, then the printer driver sends the printer a command requesting information concerning the paper type and size that were set by the print processing executed last. In response, the printer reads the settings information out of the NVRAM and transmits it to the computer. The printer driver thus acquires from the printer the information concerning the paper type and size that were set by the print processing executed last (step 504).

Upon acquiring the settings information from the printer 204, the printer driver performs a comparison for determining whether the paper type and size included in the acquired settings information are the same as those specified in the print data about to be transmitted (step 505). If the two agree, the printer driver transmits the created print data to the printer along with the settings information (step 508).

If either the paper type or size in the print processing executed last by the printer differs from the setting regarding the print data about to be transmitted, then a window (see FIG. 4) for notifying the user (the operator) of the fact that either the paper type or size setting or both in the print job about to be processed differs from the printer setting is displayed on the CRT 311 of the host computer (step 506). Upon viewing this screen, the operator goes to the printer if necessary and exchanges the paper or changes the printer settings in conformity with the print settings of the print job about to be printed.

The apparatus then waits for an input from the operator. If there is an input, then the apparatus determines whether continuation of printing has been ordered (i.e., whether the "YES" button in FIG. 4 has been clicked) (step 507). If continuation of printing has been ordered, the print data and the settings information are transmitted to the printer (step 508). If continuation of printing has not been ordered (i.e., if the "NO" button in FIG. 4 has been clicked), then the print data is discarded and print execution processing is exited.

Though the processing in the printer is not illustrated in FIG. 5, the NVRAM 320 of the printer has an area for storing the ID of the printer driver that was set by the print processing executed last by the printer and the settings information such as the paper type and size. Upon accepting from the printer driver the command requesting the ID information of the printer driver that ordered the immediately preceding printing operation (step 502), the printer reads the ID of the printer driver that ordered printing last out of the NVRAM 320 and transmits it to the computer. Further, upon accepting the command requesting the print settings information at step 504, the printer sends back to the computer the settings information such as the paper type and size set the last time print processing was executed, this information having been stored in the NVRAM 320. Furthermore, at step 508, the printer that has accepted the print data saves the printer driver ID and the settings information such as the paper type and size, which are contained in the print data, in the NVRAM 320 and performs printing in accordance with the print settings.

Thus, first it is determined whether the user recorded in the printer and the user that is about to perform printing match. If it is found that the same user is continuing to utilize the printer, then it is judged that the printer settings need not be changed and no alert relating to settings is issued. As a consequence, the user is no longer annoyed by display of an alert that is unnecessary. If it is found that the users are different, a procedure similar to that of the first embodiment is executed, thereby providing effects similar to those of the first embodiment.

Furthermore, the above effects can be obtained through an inexpensive, simple arrangement even though the printer is not equipped with mechanisms such as sensors.

First Modification of Second Embodiment

In the second embodiment it is so arranged that an ID is accepted from a printer at the time of installation in order to distinguish one user from another. However, it is also possible to transmit information capable of distinguishing a user to the printer along with the print data and have the printer store this information and distinguish among users by using this information.

In this embodiment, an identifying name is issued to a printer driver. As a result, even if a plurality of operating systems have been installed in a single computer and a printer driver has been installed in each operating system, the user of each operating system can be dealt with as a separate user.

In ordinary use of a computer, however, one printer driver is installed for dealing with one printer in one computer. Accordingly, an identifier for uniquely identifying a host on a network may be utilized instead of the printer driver ID. Adopting this expedient makes it unnecessary to issue a printer driver ID when the printer driver is installed.

Further, it is also possible to set up a utilization environment from the profile of each user by having a plurality of users log in upon entering their identifying names and passwords. In a case where a printer driver has been installed in such an operating system, the identifying name of each user can be utilized instead of the printer driver ID. By adopting this expedient, the printer can be made to recognize that a user is a different user in regard to multiple users utilizing a single computer.

Second Modification of Second Embodiment

In a manner similar to that of the third modification of the first embodiment, information on the host side and information held by the computer can also be compared in the printer with regard to printer driver ID and settings information. In this case, the host computer transmits the print data by executing step 508 immediately after step 501.

Upon receiving the print data, the printer compares the printer driver ID included in the print data with the printer driver ID stored in the NVRAM and executes printing as is if the two agree. If the two do not agree, the settings information included in the print data and the settings information stored in the NVRAM are compared and, if the two differ, processing is suspended and the computer is alerted. If the two do agree, then printing is executed as is.

Figure 4:
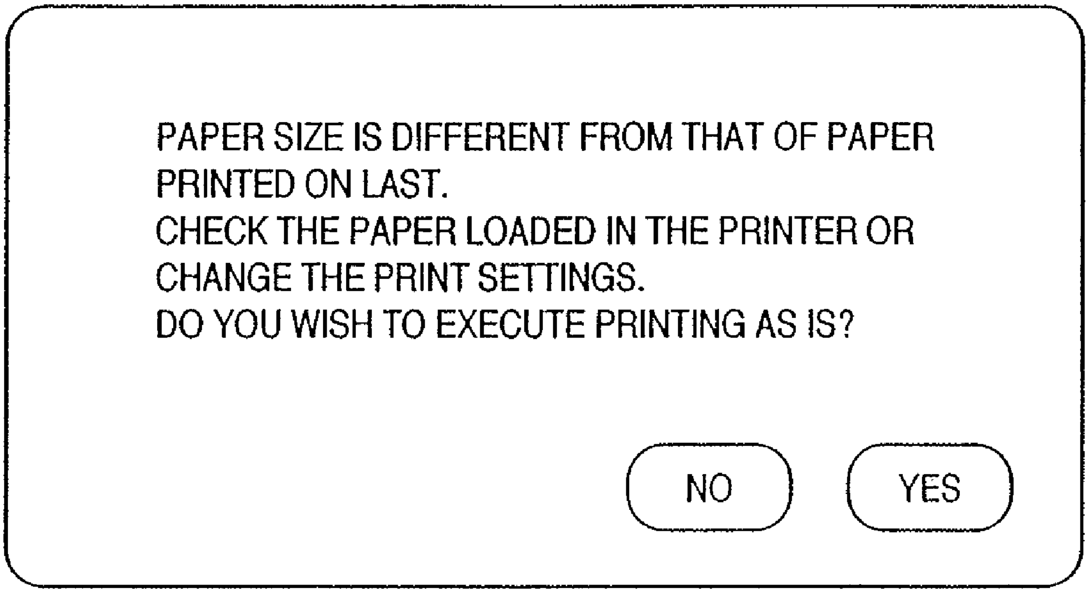
FIG. 4 is a diagram illustrating an example of a dialog screen for prompting a decision from a user as to whether printing should continue.

The computer that has been so alerted displays the alert, as shown in FIG. 4, thereby prompting the user to change or check the settings. If continuation of printing has been specified, then the computer sends the printer a command to continue with printing. If aborting of the print job has been specified, then the computer issues a command to halt print processing and to discard the print data. The printer responds to the commands by either continuing or aborting print processing.

By thus allowing the printer to compare the settings information, transmission of printer driver ID and settings information from the printer to the computer prior to transmission of the print data is not carried out and therefore the time from commanding of printing to start of printing can be curtailed in an instance where no alert is issued.

Third Embodiment

An embodiment in which the present invention is applied to a paper-clearance setting instead of paper size and type will be described as a third embodiment of the present invention.

In an input/output device such as a printer through which various types of paper are passed to implement the function of the device, the precision of the spacing between the input/output portion of the device and the paper fed through the device, namely the precision of the paper clearance, has a very large effect upon the precision of the input/output operation.

Recent advances in ink-jet technology are being applied to printers, which represent one type of input/output device, and ever higher image quality is being sought with such printers. It is required that general-purpose printers be able to accommodate the travel therethrough of various kinds of paper. In order to enhance printing precision, it is essential that the paper clearance between the printhead and the paper printed on be held constant. A method often adopted to achieve this is to adjust the distance between a paper restraining portion, which is referred to as a platen, and the printhead in accordance with the thickness of the paper. An adjustment performed by a paper-clearance adjusting lever is one such method.

Since automating this mechanism necessitates many parts and raises cost, there are also many devices that are equipped with a manual paper-thickness adjusting lever manipulated by the operator. In order to perform printing with a desired precision using a device that performs a manual paper-thickness adjustment, it is necessary to determine whether the position of the paper-clearance adjusting lever is appropriate for the type of paper. Conventionally, this entails sensing the platen position and the position of the paper-clearance adjusting lever by internal sensors, reporting the sensed lever position to a connected host computer, having the host computer determine whether the position of the paper-clearance adjusting lever is appropriate for the paper and, if the lever position is not appropriate, having the host computer prompt the operator to adjust the position of the lever.

In this embodiment there will be described a printing system in which the position of the paper-clearance adjusting lever can be set appropriately without the printer being provided with sensors for sensing the position of the platen and the position of the paper-clearance adjusting lever. In this system, it is the printer, not the host computer that creates the print data, that stores the type of paper and the position of the paper-clearance adjusting lever, and therefore the printer operates correctly even in a case where the input/output device is equipped with a plurality of interfaces and a case where there is the possibility that the device will communicate asynchronously with a plurality of host computers connected on a network. Further, since a message prompting adjustment of the lever is not necessarily displayed whenever a printing operation is performed, the operator is not alerted at times when adjustment is not actually required and, hence, the burden upon the operator is mitigated. It should be noted that this embodiment will be described based upon the system configuration shown in FIGS. 2 and 3 just as in the case of the first embodiment.

Figure 6:
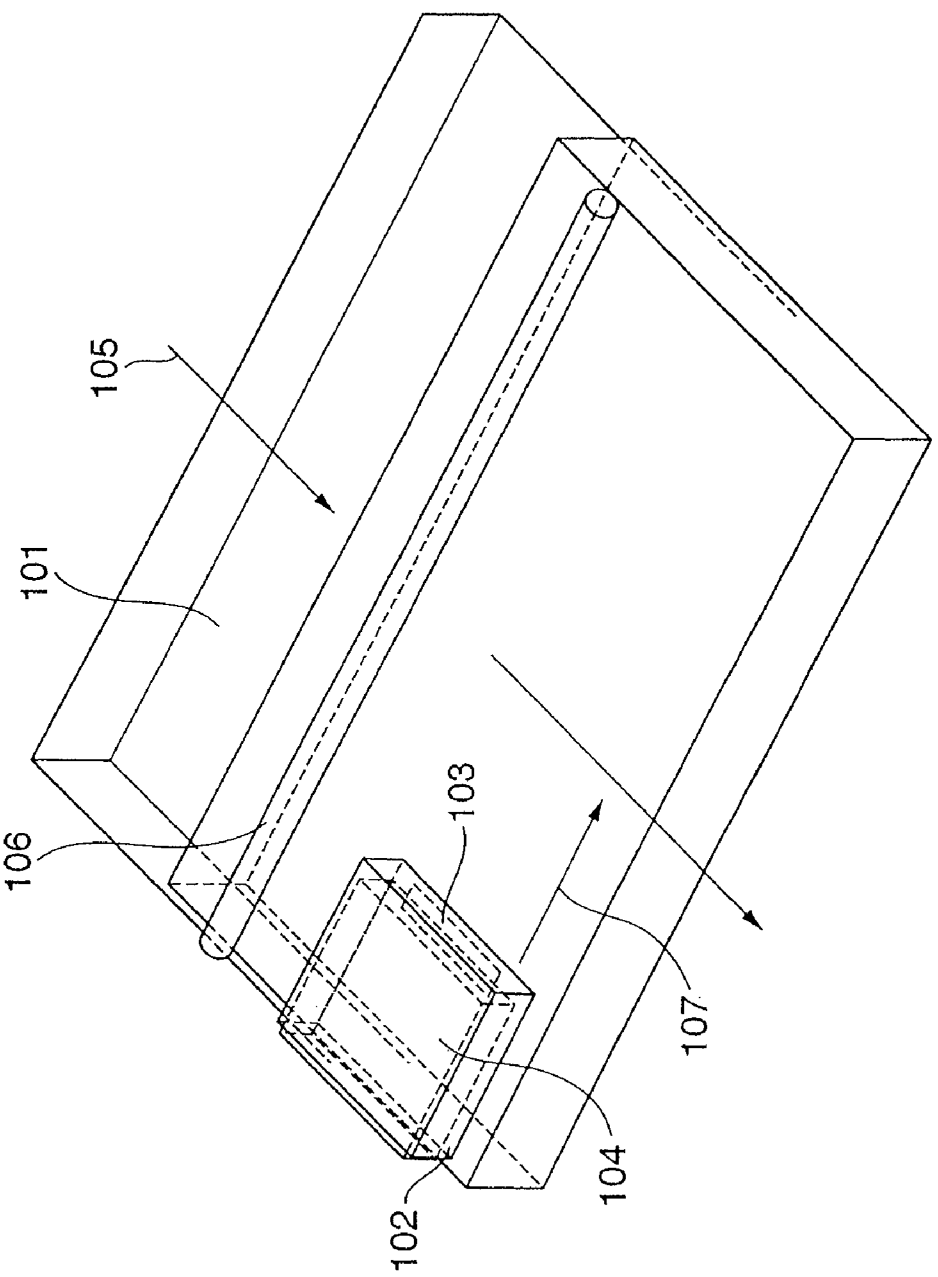
FIG. 6 is a diagram illustrating the structure of a printer according to this embodiment.
Figure 7:
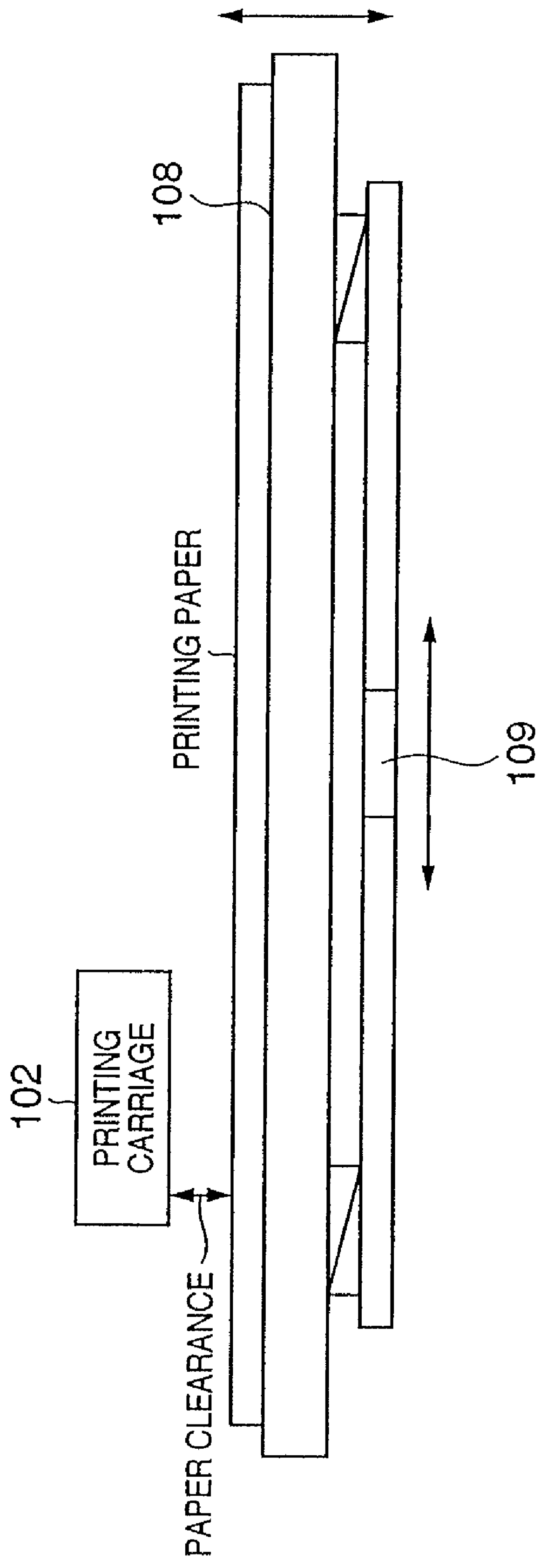
FIG. 7 is a diagram showing the structure of a platen according to this embodiment.

FIGS. 6 and 7 illustrate a printer 101 that constitutes part of the second embodiment. The printer 101 corresponds to the printer 204 depicted in FIG. 2. The printer 101 has a printing carriage 102 moved in the main-scan direction. The printing carriage 102 is equipped with a printhead 103 and an auxiliary tank 104 that accommodates ink temporarily. A paper-feed roller 106 transports printing paper in the sub-scan direction, i.e., along the direction of a paper transport path 105, and the printing carriage 102 is moved along the main-scan direction, i.e., along a cartridge travel path 107, whereby an operation for printing on the entirety of the printing medium is implemented.

FIG. 7 is a sectional view of the printer of FIG. 6 as seen from the direction of paper transport. The printhead 103 on the printing carriage 102 and the printing paper on a platen 108 are spaced apart by a paper clearance adjusted by a paper-clearance adjusting lever 109. The operator regulates the paper-clearance adjusting lever 109 to the left or right, thereby regulating the height of the platen 108 so that the gap (paper clearance) between the printhead 103 and printing paper can be adjusted. The position of the paper-clearance adjusting lever with which the printer 101 is equipped has two positions, namely a "WIDE" position and a "NARROW" position, and the paper clearance is switched between the "WIDE" and "NARROW" settings in accordance with the position of the lever.

Further, the printer 101 has a structure similar to that of the printer 204 in FIG. 3 and is equipped with the NVRAM 320, in which information indicating the position of the paper-clearance adjusting lever is recorded. This information corresponds to information indicating the position of paper-thickness adjusting means of the printer. A value decided from the print settings transmitted from the host computer to the printer 101 together with the print data is recorded as the value of the information indicating the position of the paper-clearance adjusting lever. This information also can take on either of the following two values:

WIDE: this is a case where it is assumed that the lever has been set to the "WIDE" side; and NARROW: this is a case where it is assumed that the lever has been set to the "NARROW" side.

The expression "case where it is assumed" refers to cases where the information indicative of the optimum position of the paper-clearance adjusting lever is "WIDE" and "NARROW", this information being decided in accordance with the paper type included in the print settings received from the host computer along with print data. The information is illustrated in the table of FIG. 9, described later.

An example of a procedure for when the host computer (printer driver) causes printing to be performed by the printer 101 will be described next with reference to FIG. 8. In the following description and in the drawings referred to below, the information representing the position of the paper-clearance adjusting lever stored in the NVRAM 320 of the printer shall be referred to as "lever position information".

When creation of print data is ordered by the user via an application program or the like, the printer driver of the host computer requests the printer to transmit the lever position information that is currently stored in the printer (step S11).

Upon receiving this request (step 21), the printer reads the lever position information out of the NVRAM 320 and transmits it to the host computer (step S22).

The printer driver of the host computer accepts the lever position information from the printer (step S12) and determines whether this lever position information indicates a position of the paper-clearance adjusting lever that is suited to the type of paper specified in the print data about to be created, i.e., the type of paper specified by the operator (step S13). In this embodiment, the appropriate position of the paper-clearance adjusting lever is decided to be "NARROW" if the specified paper type is "PLAIN PAPER" or "SPECIAL-PURPOSE PHOTO PAPER" and "WIDE" if the specified paper type is "ENVELOPE" (see FIG. 9). At step S13 the printer driver compares the position of the paper-clearance adjusting lever thus decided from the paper information with the lever position information received from the printer and decides that the lever position is appropriate if the two agree or inappropriate if the two do not agree.

If it is decided at step S13 that the position is appropriate, then control proceeds to step S15, where print data is created and transmitted to the printer 101.

If it is decided at step S13 that the position is inappropriate, on the other hand, then control proceeds to step S14. Here the printer driver displays a message prompting the operator to change the lever position. This message may be one obtained by changing the content of the message of FIG. 4 to content that alerts the operator to the fact that the lever position is different. In addition, "YES" and "NO" buttons are provided for allowing the operator to select whether print processing should continue or be suspended.

If the operator clicks the "YES" button upon setting the paper-clearance adjusting lever to the appropriate position or confirming that the position is the appropriate position, the printer driver proceeds to step S15 in response, creates the print data and transmits the print data to the printer 101.

Upon receiving the print data at step S23, the printer 101 decides the position of the paper-clearance adjusting lever based upon the paper information contained in this data. The decision rendered at step S23 uses criteria the same as that employed in the determination made at step S13. That is, the appropriate position of the paper-clearance adjusting lever is decided to be "NARROW" if the paper type is "PLAIN PAPER" or "SPECIAL-PURPOSE PHOTO PAPER" and "WIDE" if the paper type is "ENVELOPE" (see FIG. 9). Thus calculating the lever position information from the paper information is advantageous in that the printer driver need no longer add on the appropriate position of the paper-clearance adjusting lever to the print data anew. Of course, equivalent results can be obtained by having the printer driver append appropriate lever position information to the print data and then transmit the data to the printer.

The printer 101 stores the position of the paper-clearance adjusting lever calculated at step S24 in storage means (the NVRAM 320 in the arrangement of FIG. 3) at step S25 and performs printing on the paper at step S26, whereby this series of operations is completed.

Thus, lever position information that has been calculated from print data that was processed last is stored in storage means of the printer. As a result, even if printing is carried out successively from a different computer, the appropriate position of the paper-clearance adjusting lever is set by a procedure identical with that described above and this position information is stored in storage means at the end of the printing operation.

Thus, the printing system according to this embodiment is such that whether the position of paper-thickness adjusting means is appropriate for print settings specified by the operator, i.e., whether the position of the paper-clearance adjusting lever is appropriate, can be determined using even a printer that is not equipped with a sensor for sensing the position of the paper-clearance adjusting lever. This means that it is unnecessary to provide a printer with a sensor that senses the position of the paper-clearance adjusting lever. Since the number of parts is correspondingly small, usability can be enhanced at low cost.

Fourth Embodiment

The printer according to the third embodiment assumes solely connection to a computer. However, printers that have a general-purpose data processing system and that are connectable to devices other than personal computers also exist. For example, information devices such as PDAs, digital cameras and mobile telephones referred to as non-personal computers often come equipped with wireless interfaces such as IrDA and BlueTooth. Printers equipped with these interfaces and having a processing system for JPEG image data and general-purpose data such as text data and vCard data are capable of supporting such data and can print data received from non-personal computers. Many of these non-personal computers have limitations. Specifically, they do not have an internal printer driver exclusively for a printer and even if lever position information is sent back to the non-personal computer before printing is carried out, the non-personal computer cannot display a suitable message and cannot incorporate paper-type information in print data. This means that with the system conceived as the third embodiment, processing cannot be executed properly in regard to a non-personal computer. The fourth embodiment is capable of dealing even with such cases by having a printer operate in the manner described below.

In this embodiment, the information indicating the position of the paper-clearance adjusting lever takes on any of the three following values:

WIDE: this is a case where it is assumed that the lever has been set to the “WIDE” side;

NARROW: this is a case where it is assumed that the lever has been set to the “NARROW” side; and INDEFINITE: this is a case where the position of the paper-clearance adjusting lever cannot be inferred (the value is “INDEFINITE” also when the printer is shipped).

Specifically, the expression “case where it is assumed” corresponds to cases where the information indicative of the optimum position of the paper-clearance adjusting lever is “WIDE” and “NARROW”, this information, which is illustrated in the table of FIG. 9, being decided in accordance with the paper type included in the print settings received from the host computer along with print data, and to a case where the lever position after printing decided in accordance with the lever position before printing corresponds to “NARROW” or “INDEFINITE”, these lever positions being illustrated in the table of FIG. 10. Accordingly, in this embodiment, if the device serving as the host is a computer, processing proceeds through a procedure similar to that of the third embodiment. In such case, therefore, the lever position information is decided according to the rule shown in FIG. 9 in a manner similar to that of the third embodiment.

On the other hand, if a non-personal computer is the host, processing proceeds through a procedure described later. In such case the lever position information is decided according to the rule shown in FIG. 10. In this embodiment, data supported by a printer in a non-personal computer environment is a JPEG image or character information (a text file, vCard, vCalendar, etc.), and it is assumed that special-purpose photo paper and plain paper, respectively, are used as the types of paper for printing this data. The paper-clearance adjusting lever in either case should be set to the “NARROW” side.

Figure 8:
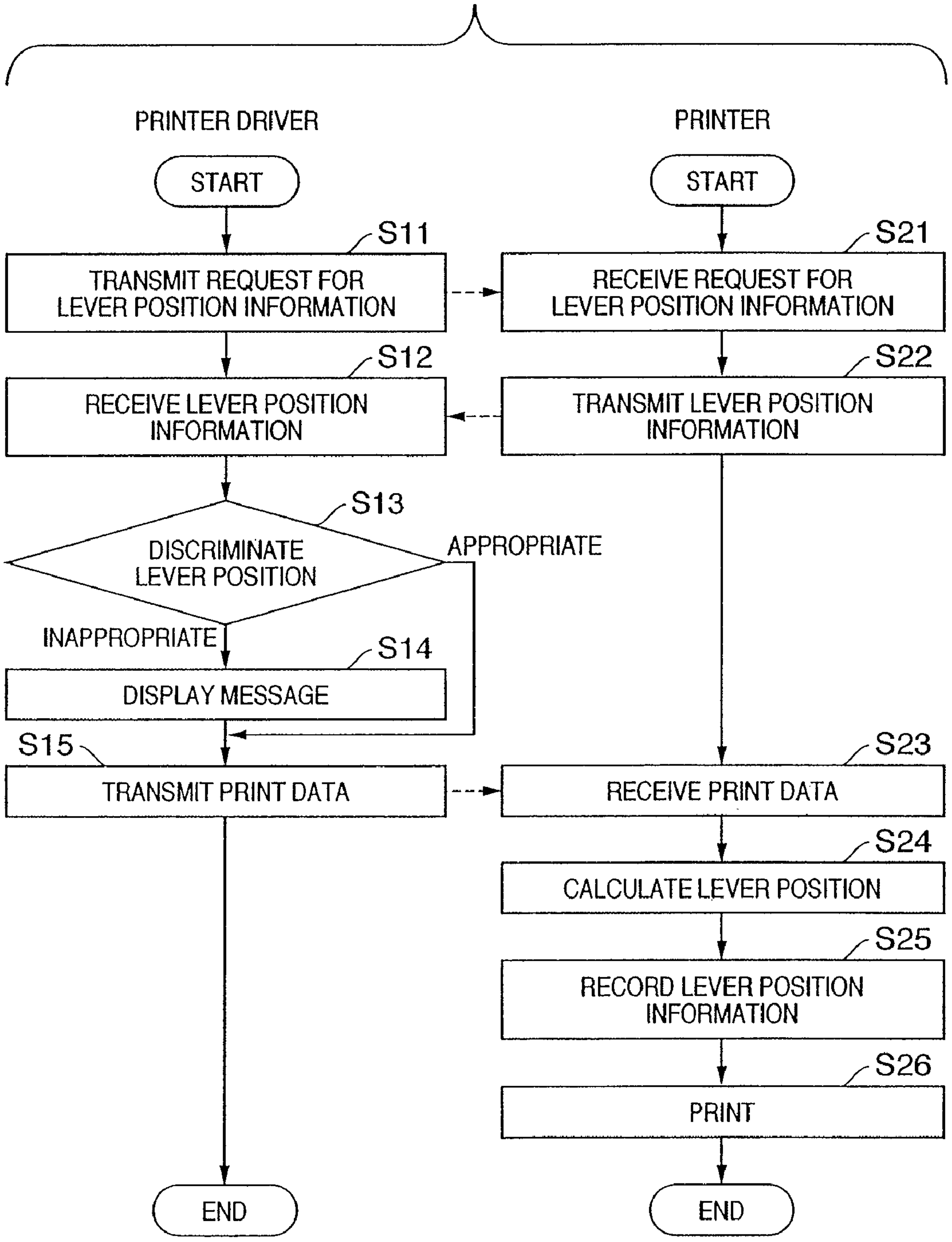
FIG. 8 is a flowchart according to this embodiment.

As mentioned above, a non-personal computer is not equipped with a printer driver and therefore executes only step S15 in FIG. 8 if printing is to be performed from this device. Accordingly, steps S21 to S22 are not executed in the printer. If print data has been received from a non-personal computer, the printer decides the information indicative of the paper-clearance adjusting lever according to the rule of FIG. 10 at step S24, records this information at step S25 and prints it at step S26, thereby completing this series of operations. The lever position information before printing shown in FIG. 10 refers to a value of lever position information recorded in the NVRAM 320 until the value is updated at step S25, and the lever position information after printing shown in FIG. 10 refers to a value of lever position information decided by the rule of FIG. 10 based upon the value of lever position information before printing.

In a case where the printer 101 has received print data from a host, for example, the printer determines whether a lever-position information request was received immediately prior to receipt of the data and can determine that the host is a computer if the request was received and that the host is a non-personal computer if the request was not received.

Assume that an operator 1 (a user who refers to a manual as necessary and is capable of selecting the appropriate lever position that conforms to the paper even without guidance from a device) and an operator 2 (a user who is incapable of changing the lever position without guidance) exist. It can be expected that operator 1 will set the lever position to the appropriate side (NARROW) before printing from a digital camera or the like is performed. It can be predicted that because operator 2 obtains no guidance from a digital camera or the like, the lever position will be left as is irrespective of printing. Accordingly, if the lever position before printing is “NARROW”, it can be predicted that this position will remain in effect even after printing. If the lever position before printing is “WIDE”, whether an adjustment will be performed depends upon the operator and therefore the lever position information prevailing after printing is set to “INDEFINITE”, which signifies that what the lever position will be after printing cannot be determined. The same holds true in a case where the lever position before printing is “INDEFINITE”. The table of FIG. 10 has been created so as to deal with either of the above-mentioned operators.

Next, in a case where printing has been performed from a personal computer, the printer driver of the personal computer and the printer operate in accordance with the flowchart of FIG. 8. At this time the lever position information is decided in accordance with the table of FIG. 9. However, according to this embodiment, lever position information that has received data from a printer can also be “INDEFINITE”. In such case the lever position is judged to be inappropriate at step S13. The printer driver always displays a message prompting the operator to check the position of the paper-clearance adjusting lever and to change it in appropriate fashion, whereby operation similar to that of the third embodiment is performed.

Thus, even in a system in which a printer can receive and print data from a device not equipped with a printer driver, this data can be processed properly.

Fifth Embodiment

The printer in the third and fourth embodiments is premised on the fact that a printer driver displays a message to the operator by utilizing the display function of a personal computer and accepts an input from the operator. In a fifth embodiment, the printer is equipped with a display device and an input device and the printer itself can prompt the operator to check and set the paper-clearance adjusting lever.

Figure 11:
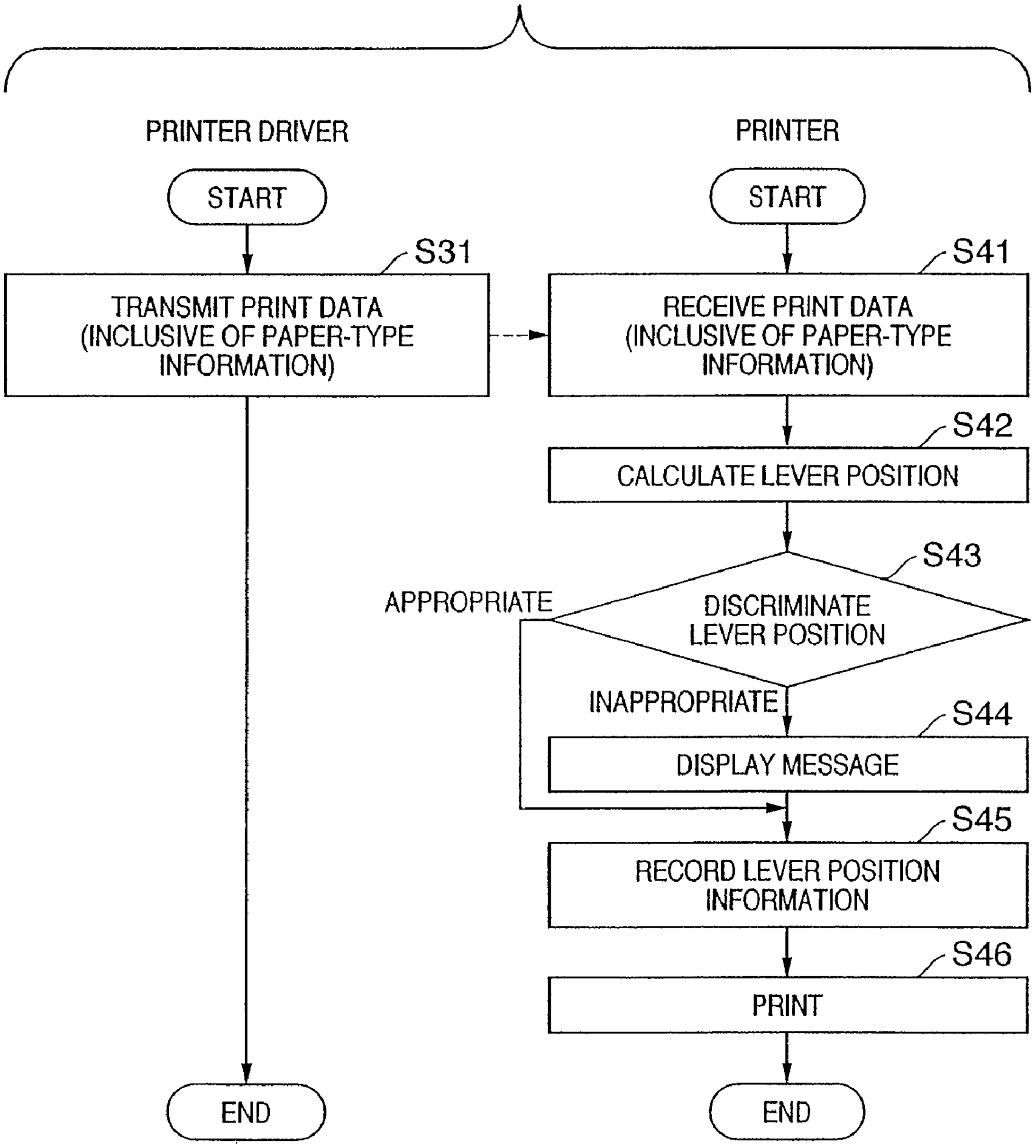
FIG. 11 is a flowchart according to this embodiment.

Reference will be had to FIG. 11 to describe the operation of a printer driver and printer in a system premised solely on connection to a host computer equipped with a printer driver in a manner similar to that of the third embodiment.

In FIG. 11, print data inclusive of paper-type information is transmitted from the printer driver to the printer at steps S31, S41. Next, at step S42, the printer calculates the position of the paper-clearance adjusting lever in accordance with FIG. 9 from the paper-type information, which has been placed at the leading end of the print data. At step S43 the printer compares the calculated position with the information indicating the position of the paper-clearance adjusting lever that has been stored within the printer. Control proceeds to step S45 directly if the position of the paper-clearance adjusting lever is found to be appropriate at step S43. If the position of the paper-clearance adjusting lever is found to be inappropriate, on the other hand, then control proceeds to step S44. Here the printer presents a display, prompts the operator to adjust the position of the paper-clearance adjusting lever and, upon recognizing that adjustment of the lever position has been completed, as by recognizing depression of a key, advances control to step S45. Here the printer stores the position of the paper-clearance adjusting lever and, at step S46, performs printing, thereby ending this series of operations. The determination made at step S44 is similar to that made at step S13 in FIG. 8 of the third embodiment.

Furthermore, in a case where printing is performed from a non-personal computer in a manner similar to that of the fourth embodiment, the sequence of printing from the non-personal computer is equivalent to the above-described procedure performed by the printer driver. If print data has been transmitted from the non-personal computer in such case, the printer cannot acquire paper information from the print data at step S42 in FIG. 11. However, if the information indicating the position of the paper-clearance adjusting lever saved within the printer is found not to be "WIDE" at step 43, control proceeds directly to step S45. If the position is found to be "WIDE", then control proceeds to step S44, a display is presented and the operator is prompted to adjust the position of the paper-clearance adjusting lever. If the printer recognizes by a method such as depression of a key that adjustment of the lever has been completed, control proceeds to step S45. Thus, a system equivalent to that in the case where the computer is a host can be constructed.

Thus, with the printing system according to the embodiments as described above, whether the position of paper-thickness adjusting means is appropriate for print settings that have been specified by an operator, i.e., whether the position of a paper-clearance adjusting lever is appropriate for the settings, can be determined using a printer not equipped with a sensor for sensing the position of the paper-clearance adjusting lever. As a result, the printer need not have a sensor for sensing the position of the paper-clearance adjusting lever and, hence, the number of component parts is small. This makes it possible to improve usability a low cost.

Modifications of First to Fifth Embodiments

The foregoing embodiments are described taking as an example a system in which a printer is utilized from a computer. However, the present invention is applicable to input/output devices having manual setting items required to be set directly by a manual operation in the device. More specifically, in a case where a user has used a host apparatus to order that an input/output operation is to be performed using such an input/output device, the value of a manually set item is decided in accordance with an input/output setting that has been made by the user with regard to information, etc., to be input and output, and the set value of the device thus decided is compared with the value of the manually set item stored in the input/output device. If the two agree, the input/output device regards the setting desired by the user to already be in effect and then performs the input/output operation. If the two values do not agree, then the user is prompted to change the manual setting and the input/output operation continues in accordance with a sign that processing is to continue. At such time the value of the manually set item that has been decided in accordance with the input/output setting made by the user is stored in a storage unit of the input/output device, this value being regarded as indicating the present setting of this device.

Thus, whenever an input/output operation that requires a changeover in a manually set item of a device is requested, this fact can be reported to the user to prompt the user to perform an operation. Even if the device is not equipped with a sensor for actually sensing a manual setting, a situation in which an input/output operation is performed on the basis of an erroneous setting can be prevented.

Sixth Embodiment

A sixth embodiment of the present invention will now be described with reference to the drawings. This embodiment resembles the first embodiment in that if the type of medium printed on last and acquired from the printer differs from the type of medium about to be printed on, a confirmation message is displayed at the host computer to request a confirmation input from the user. However, in the sixth embodiment, the confirmation message is not merely a message as to whether printing should continue or not but is for further allowing a confirmation operation to be performed at a printer. If performance of a confirmation operation has been selected, printing does not merely continue. Rather, a print command referred to as a "confirmation print command" is issued and sent from the host computer (printer driver) to the printer and the user is allowed to make a confirmation input at the host computer. This distinguishes the sixth embodiment from the first embodiment. A printing system according to the sixth embodiment will be described below. In this embodiment, the term "print command" is used but is employed in the same sense as "print data" in the first to fifth embodiments. Further, the implementation illustrated in FIGS. 2 and 3 is applied similarly to this embodiment as well.

Figure 12:
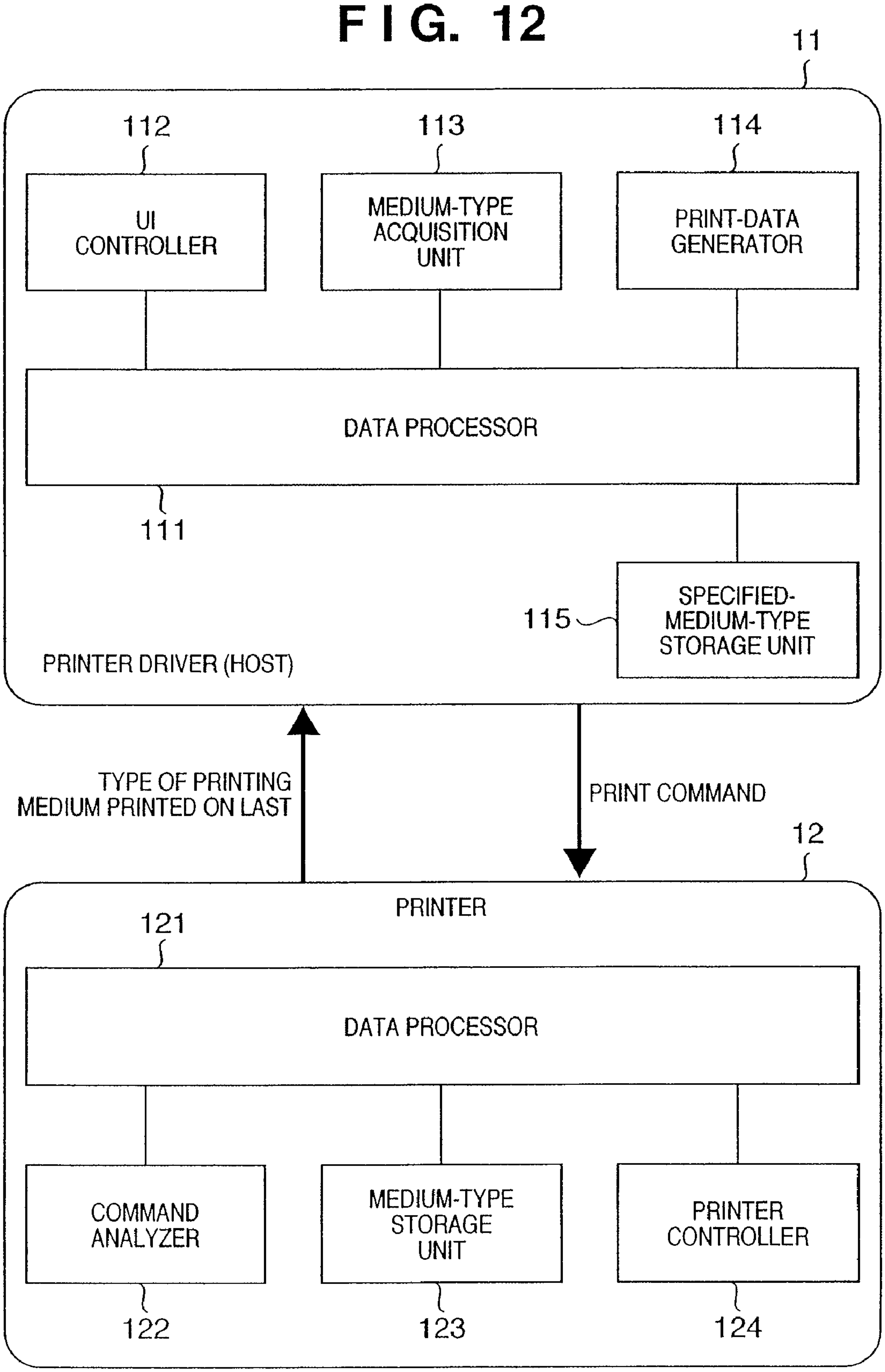
FIG. 12 illustrates a system configuration.

FIG. 12 is a diagram showing the overall configuration of the printing system according to the present invention. The entire system is composed of two sections, namely a printer driver 11, which has been installed in a host computer, and a printer 12. Though the description that follows treats the printer driver 11 as if it were a device, there are cases where this signifies the computer in which the printer driver 11 has been installed.

The printer driver 11 (namely the computer in which the printer driver has been installed) and the printer 12 are connected as by a USB cable or network, etc., and can communicate with each other. The printer driver 11 not only sends a print command to the printer 12 but it is also possible for the printer 12 to send back a variety of states in response to an inquiry from the printer driver 11. It should be noted that the structures internally of the printer driver and printer are described mainly in regard to those portions that are related to the present invention.

The printer driver 11 is internally provided with a data processor 111 that executes various data processing within the driver. The specific content of this processing according to the invention will be described later with reference to FIG. 13. A UI (user interface) controller 112 displays a user interface screen and processes inputs from the user. A printing-medium-type acquisition unit 113 queries the printer 12 and acquires the type of printing medium on which the printer 12 printed last. A print-data generator 114 accepts print data from within an application and generates a print command that can actually be interpreted by the printer 12. A specified-medium-type storage unit 115 saves the type of printing medium that the user has indicated to the printer driver.

Figure 13:
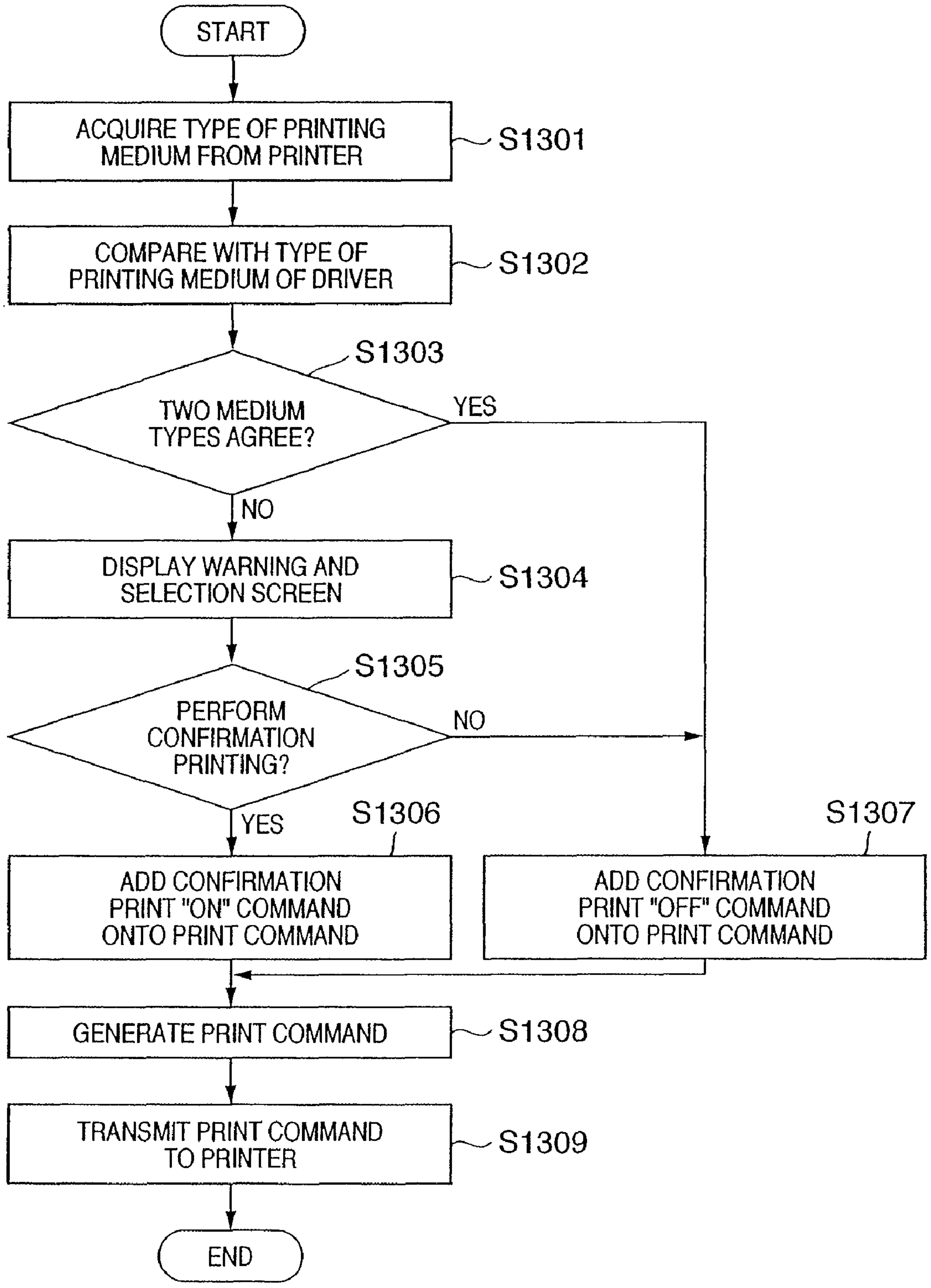
FIG. 13 is a flowchart illustrating the flow of processing in a printer driver.

A data processor 121 within the printer 12 executes various data processing in the printer 12. The details of the flow of this processing are illustrated in FIG. 13. A command analyzer 122 accepts a print command transmitted from the printer driver 11, analyzes the command and obtains the necessary information. A printing-medium-type storage unit 123, which is constituted by a memory such as an EEPROM the content whereof is retained even if the printer power supply is turned off, stores the type of medium on which printing was performed last. In accordance with the print command received from the printer driver 11, a printer controller 124 actually controls the motor and printhead of the printer 12, whereby a printing operation is carried out.

The flow of processing by the printer driver 11 and printer 12 according to the present invention will now be described. FIG. 13 illustrates the flow of processing by the printer driver 11 according to the present invention, this processing being executed after execution of print processing has been ordered from within application software running on the host computer. It should be noted that before execution of printing is ordered from within the application software, the user employs the user interface of the application software or the user interface of the printer driver to specify the type of printing medium for the print data generated, and the printer driver retains the specified type of printing medium in the medium-type storage unit 115. In other words, the medium type being held in the medium-type storage unit 115 is the present medium type of the printer driver 11. The procedure of processing illustrated in FIG. 13 is as follows:

S1301: The printer driver instructed to execute printing acquires the type of printing medium from the printer 12. More specifically, the printing-medium-type acquisition unit 113 queries the printer 12 about the type of medium that was printed on last and accepts the result. The data processor 111 acquires, from the printing-medium-type acquisition unit 113, the type of medium printed on last by the printer 12.

S1302: The data processor 111 compares the medium type accepted at S1301 and the medium type that has been stored in the medium-type storage unit 115.

S1303: If it is found at S1302 that both medium types agree, control proceeds to S1307; otherwise, control proceeds to S1304.

Figure 15:
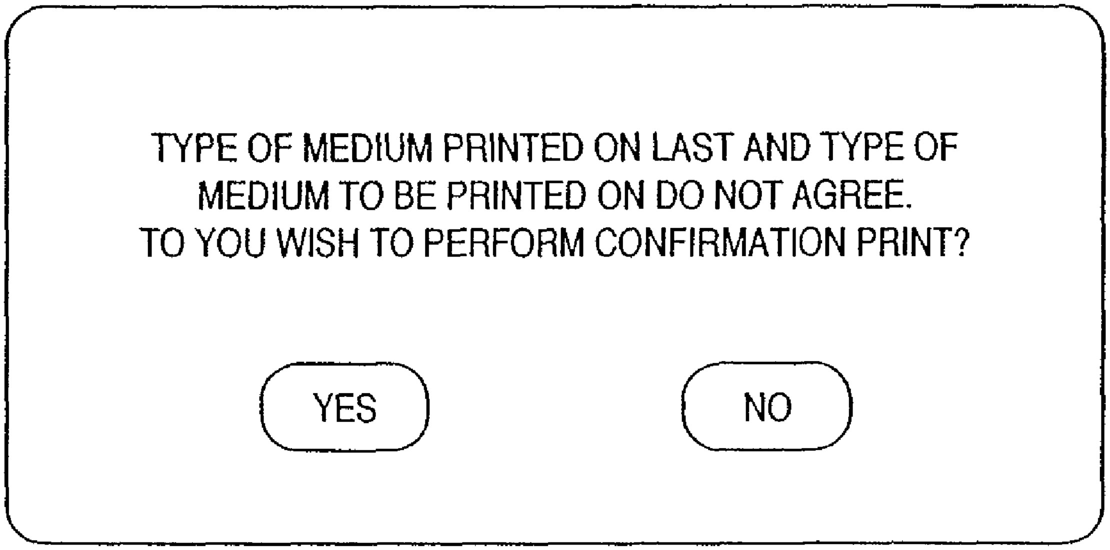
FIG. 15 is a diagram illustrating an example display of a selection screen.

S1304: If the medium type printed on last by the printer 12 and the present medium type of the printer driver 11 do not agree, the data processor 111 reports the medium-type mismatch to the user via the UI controller 112 and prompts the user to select processing. An example of this display is depicted in FIG. 15. In the display shown in FIG. 15, the user can select "YES" (perform confirmation printing) or "NO" (do not perform confirmation printing). The UI controller 112 reports the result of the user's selection to the data processor 111. If the user has already ascertained the medium being supplied to the printer, there is a possibility that the user will select "NO".

S1305: Control proceeds to S1306 if the user has selected "YES" at S1304 and to S1307 if the user has selected "NO".

S1306: The data processor 111 generates a "CONFIRMATION PRINT ON" command, which signifies that confirmation printing is to be performed. Control then proceeds to S1308. Here, upon receiving a print-command string that includes this "CONFIRMATION PRINT ON" command, the printer 12 transitions to a standby state without performing a printing operation until the user presses a "CONFIRM" button on the printer 12.

S1307: The data processor 111 generates a "CONFIRMATION PRINT OFF" command, which signifies that confirmation printing is not to be performed. Control then proceeds to S1308. Here, upon receiving a print-command string that includes this "CONFIRMATION PRINT OFF" command, the printer 12 performs a printing operation as is without waiting.

S1308: The print-data generator 114 receives the print data from the application and generates a print-command string. The data processor 111 further adds the confirmation print command, which was generated at S1306 or S1307, onto the print-command string. At this time a command representing the present type of printing medium also is included in the print command.

S1309: Finally, the data processor 111 sends the printer 12 the print-command string generated at S1308.

Figure 14:
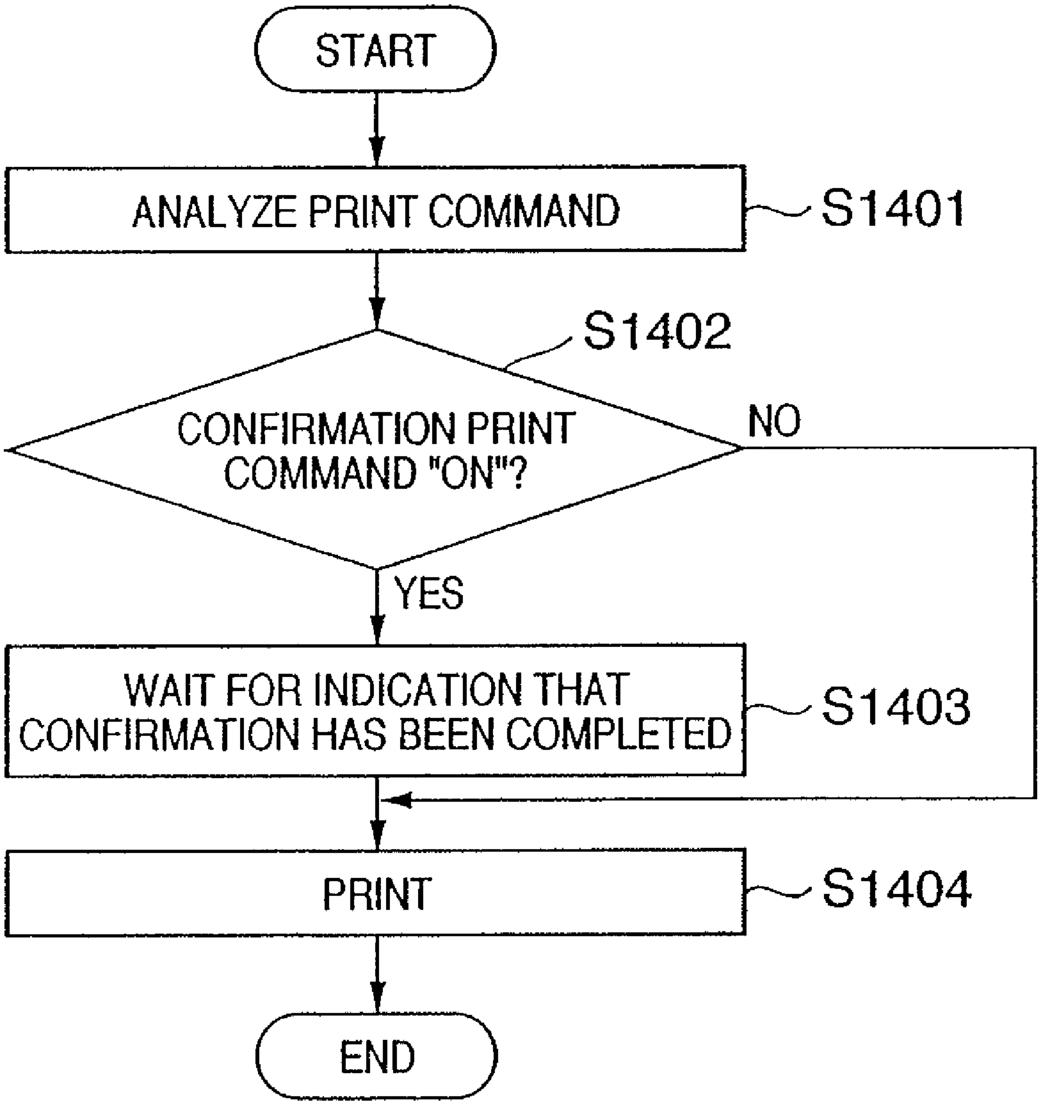
FIG. 14 is a flowchart illustrating the flow of print processing in a printer.

This ends the processing executed within the printer driver 11. The flow of processing within the printer 12 will be described next with reference to FIGS. 14 and 16. First, reference will be had to FIG. 16 to describe the flow of processing by the printer 12 in response to the medium-type inquiry from the printer driver 11 in the host computer. The flow of FIG. 16 starts when the data processor 121 in printer 12 receives from the printer driver 11 an order to acquire the type of medium printed on last.

S1601: The data processor 121 acquires the type of printing medium from the printing-medium-type storage unit 123 that stores the type of printing medium printed on last. It should be noted that the type of printing medium printed on last has been stored in the printing-medium-type storage unit 123 because step S1401 in FIG. 14 (described later) is executed at the time of execution of print processing by the printer 12.

S1602: The data processor 121 sends the printer driver 11 the medium type acquired at S1601.

This ends the processing executed by the printer 12 in response to the inquiry regarding the type of printing medium. Next, the processing of the printer 12, which receives a print command from the printer driver 11 and executes a printing operation, will be described with reference to FIG. 14.

S1401: The data processor 121 accepts a print command string from the printer driver 11 and delivers it to the command analyzer 122. The latter analyzes the delivered print command string, extracts the confirmation print command and the type of printing medium and transmits these to the data processor 121. The latter stores the type of printing medium extracted by the command analyzer 122 in the printing-medium-type storage unit 123.

S1402: If the confirmation print command sent to the data processor 121 at S1401 is "CONFIRMATION PRINT OFF", control proceeds to S1401. If the command is "CONFIRMATION PRINT ON", control proceeds to S1403.

S1403: Since the confirmation print command is ON, the data processor 121 stands by until a confirmation button (the control panel 321 in FIG. 3) on the printer 12 is pressed. If the confirmation operation by the user is finished and the confirmation button on the printer 12 is pressed, control proceeds to S1404.

S1404: The data processor 121 delivers the print command string, which has been accepted from the printer 11, to the printer controller 124 and performs the actual printing operation.

This ends the print processing executed by the printer.

An effect gained by the above processing is that printing on a printing medium not intended by the user is prevented by printing-medium confirmation processing even in a printer not equipped with a sensor for sensing the printing medium. Further, printing can be started by a confirmation switch on the printer and the user need not take the trouble to return to the host computer after confirmation of the printing medium.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A printing system, comprising:

a request unit, configured to request to transmit information of a position of the paper clearance adjusting lever currently stored in a printer from the printer;

a reception unit, configured to receive the information of the position of the paper clearance adjusting lever transmitted from the printer in response to the request;

a determination unit, configured to determine whether or not the position of the paper clearance adjusting lever indicated by the information received by said reception unit is appropriate to a sheet designated in print data to be generated;

a processing unit, configured to generate the print data and transmit it if it is determined that the position of the paper clearance adjusting lever indicated by the information received by said reception unit is appropriate to the sheet designated in the print data to be generated, and to output a warning if it is determined that the position of the paper clearance adjusting lever indicated by the information received by said reception unit is inappropriate to the sheet designated in the print data to be generated;

a decision unit, configured to decide a position of the paper clearance adjusting lever based on the sheet designated by the print data transmitted by said processing unit;

a storage unit, configured to store information of the position of the paper clearance adjusting lever decided by said decision unit in order to transmit information of the position of the paper clearance adjusting lever in response to the request made by said request unit; and a print unit, configured to perform printing based on the print data transmitted by said processing unit.

2. An information processing apparatus, comprising:

a request unit, configured to request to transmit information of a position of the paper clearance adjusting lever currently stored in a printer from the printer;

a reception unit, configured to receive the information of the position of the paper clearance adjusting lever transmitted from the printer in response to the request;

a determination unit, configured to determine whether or not the position of the paper clearance adjusting lever indicated by the information received by said reception unit is appropriate to a sheet designated in print data to be generated; and a processing unit, configured to generate the print data and transmit it to the printer if it is determined that the position of the paper clearance adjusting lever indicated by the information received by said reception unit is appropriate to the sheet designated in the print data to be generated, and to output a warning if it is determined that the position of the paper clearance adjusting lever indicated by the information received by said reception unit is inappropriate to the sheet designated in the print data to be generated, wherein the printer comprises:

a decision unit, configured to decide a position of the paper clearance adjusting lever based on the sheet designated by the print data transmitted by said processing unit;

a storage unit, configured to store information of the position of the paper clearance adjusting lever decided by said decision unit in order to transmit information of the position of the paper clearance adjusting lever to the information processing apparatus in response to the request made by said request unit; and a print unit, configured to perform printing based on the print data transmitted by said processing unit.

3. A printer connected with an information processing apparatus that comprises a request unit, configured to request to transmit information of a position of the paper clearance adjusting lever currently stored in a printer from the printer;

a reception unit, configured to receive the information of the position of the paper clearance adjusting lever transmitted from the printer in response to the request; a determination unit, configured to determine whether or not the position of the paper clearance adjusting lever indicated by the information received by said reception unit is appropriate to a sheet designated in print data to be generated; and a processing unit, configured to generate the print data and transmit it to the printer if it is determined that the position of the paper clearance adjusting lever indicated by the information received by said reception unit is appropriate to the sheet designated in the print data to be generated, and to output a warning if it is determined that the position of the paper clearance adjusting lever indicated by the information received by said reception unit is inappropriate to the sheet designated in the print data to be generated, said printer comprising:

a decision unit, configured to decide a position of the paper clearance adjusting lever based on the sheet designated by the print data transmitted by said processing unit;

a storage unit, configured to store information of the position of the paper clearance adjusting lever decided by said decision unit in order to transmit information of the position of the paper clearance adjusting lever to the information processing apparatus in response to the request made by said request unit; and a print unit, configured to perform printing based on the print data transmitted by said processing unit.

4. An information processing method executed by a information processing apparatus connected with a printer, said method comprising the steps of:

requesting to transmit information of a position of the paper clearance adjusting lever currently stored in a printer from the printer;

receiving the information of the position of the paper clearance adjusting lever transmitted from the printer in response to the request;

determining whether or not the position of the paper clearance adjusting lever indicated by the information received in the receiving step is appropriate to a sheet designated in print data to be generated;

generating the print data and transmitting it to the printer if it is determined that the position of the paper clearance adjusting lever indicated by the information received in the receiving step is appropriate to the sheet designated in the print data to be generated; and outputting a warning if it is determined that the position of the paper clearance adjusting lever indicated by the information received in the receiving step is inappropriate to the sheet designated in the print data to be generated, wherein the printer comprises:

a decision unit, configured to decide a position of the paper clearance adjusting lever based on the sheet designated by the print data transmitted in the processing step;

a storage unit, configured to store information of the position of the paper clearance adjusting lever decided by said decision unit in order to transmit information of the position of the paper clearance adjusting lever in response to the request made in the requesting step; and a print unit, configured to perform printing based on the print data transmitted in the processing step.

5. A non-transitory computer readable medium in which a program for causing a computer connected with a printer to execute an information processing method, said method comprising the steps of:

requesting to transmit information of a position of the paper clearance adjusting lever currently stored in a printer from the printer;

receiving the information of the position of the paper clearance adjusting lever transmitted from the printer in response to the request;

determining whether or not the position of the paper clearance adjusting lever indicated by the information received in the receiving step is appropriate to a sheet designated in print data to be generated;

generating the print data and transmitting it to the printer if it is determined that the position of the paper clearance adjusting lever indicated by the information received in the receiving step is appropriate to the sheet designated in the print data to be generated; and outputting a warning if it is determined that the position of the paper clearance adjusting lever indicated by the information received in the receiving step is inappropriate to the sheet designated in the print data to be generated, wherein the printer comprises:

a decision unit, configured to decide a position of the paper clearance adjusting lever based on the sheet designated by the print data transmitted in the processing step;

a storage unit, configured to store information of the position of the paper clearance adjusting lever decided by said decision unit in order to transmit information of the position of the paper clearance adjusting lever in response to the request made in the requesting step; and a print unit, configured to perform printing based on the print data transmitted in the processing step.

* * * * *